(12) United States Patent
Wolthuis et al.

(10) Patent No.: US 10,291,782 B2
(45) Date of Patent: *May 14, 2019

(54) SYSTEM AND METHOD FOR A WORK DISTRIBUTION SERVICE

(71) Applicant: Twilio, Inc., San Francisco, CA (US)

(72) Inventors: John Wolthuis, San Francisco, CA (US); Robert Brazier, San Francisco, CA (US)

(73) Assignee: Twilio, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/979,073

(22) Filed: May 14, 2018

(65) Prior Publication Data

US 2018/0262620 A1    Sep. 13, 2018

Related U.S. Application Data

(63) Continuation of application No. 15/450,883, filed on Mar. 6, 2017, now Pat. No. 10,003,693, which is a
(Continued)

(51) Int. Cl.
    *H04M 3/523*    (2006.01)
    *H04M 3/51*     (2006.01)
    *G06Q 10/06*    (2012.01)

(52) U.S. Cl.
    CPC ...... *H04M 3/5235* (2013.01); *G06Q 10/0633* (2013.01); *G06Q 10/063114* (2013.01);
    (Continued)

(58) Field of Classification Search
    CPC .................................................... Y04S 10/54
    See application file for complete search history.

(56) References Cited

U.S. PATENT DOCUMENTS

| 5,274,700 A | 12/1993 | Gechter et al. |
| 5,526,416 A | 6/1996  | Dezonno et al. |

(Continued)

FOREIGN PATENT DOCUMENTS

| DE | 1684587 A1 | 3/1971 |
| EP | 0282126 A2 | 9/1988 |

(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.

(Continued)

*Primary Examiner* — Harry S Hong
(74) *Attorney, Agent, or Firm* — Schwegman Lundberg & Woessner, P.A.

(57) ABSTRACT

Systems and methods for a work distribution service. At a multi-tenant platform that provides a work distribution service for a plurality of external systems, a priority is assigned to a first work item of a first external system. The work item is received via a RESTful work item API call request. The priority is assigned based on work item attributes of the work item and a workflow instruction corresponding to workflow information specified by the work item. The workflow instruction is provided by the external system via a RESTful Workflow API. A worker is assigned to the work item based on: the priority of the work item, the workflow information, and worker state managed by the first external system via a RESTful Worker API. The worker state includes worker attributes. The work item is generated by the external system, and the workflow instruction is managed by the external system.

20 Claims, 20 Drawing Sheets

Related U.S. Application Data continuation of application No. 15/099,931, filed on Apr. 15, 2016, now Pat. No. 9,628,624, which is a continuation of application No. 14/659,332, filed on Mar. 16, 2015, now Pat. No. 9,344,573.

(60) Provisional application No. 61/953,562, filed on Mar. 14, 2014.

(52) U.S. Cl.
CPC ....... *H04M 3/5175* (2013.01); *H04M 3/5232* (2013.01); *H04M 3/5233* (2013.01); *Y04S 10/54* (2013.01)

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |

(56) References Cited

U.S. PATENT DOCUMENTS

| | | |
|---|---|---|
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,346,630 B1 | 1/2013 | Mckeown |
| 8,355,394 B2 | 1/2013 | Taylor et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,204,281 B2 | 12/2015 | Ramprasad et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |

(56) References Cited

U.S. PATENT DOCUMENTS

| | | |
|---|---|---|
| 9,344,573 B2 * | 5/2016 | Wolthuis .............. H04M 3/5233 |
| 9,378,337 B2 | 6/2016 | Kuhr |
| 9,456,008 B2 | 9/2016 | Lawson et al. |
| 9,456,339 B1 | 9/2016 | Hildner et al. |
| 9,596,274 B2 | 3/2017 | Lawson et al. |
| 9,628,624 B2 * | 4/2017 | Wolthuis .............. G06Q 10/0633 |
| 9,632,875 B2 | 4/2017 | Raichstein et al. |
| 10,003,693 B2 | 6/2018 | Wolthuis et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Mansour |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |

(56) References Cited

U.S. PATENT DOCUMENTS

| | | |
|---|---|---|
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |

(56) References Cited

U.S. PATENT DOCUMENTS

| | | |
|---|---|---|
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Home et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0264180 A1* | 9/2015 | Wolthuis ............ H04M 3/5233 379/265.12 |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1* | 8/2016 | Wolthuis ............ H04M 3/5233 |

(56) References Cited

U.S. PATENT DOCUMENTS

| | | |
|---|---|---|
| 2016/0239770 A1 | 8/2016 | Batabyal et al. |
| 2017/0208178 A1 | 7/2017 | Wolthuis et al. |
| 2017/0339283 A1 | 11/2017 | Chaudhary et al. |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 14/659,332, Corrected Notice of Allowance dated Feb. 3, 2016", 2 pgs.
"U.S. Appl. No. 14/659,332, Non Final Office Action dated Jun. 8, 2015", 8 pgs.
"U.S. Appl. No. 14/659,332, Notice of Allowance dated Jan. 22, 2016", 5 pgs.
"U.S. Appl. No. 14/659,332, Response filed 10-13-15 to Non Final Office Action dated Jun. 8, 2015", 12 pgs.
"U.S. Appl. No. 15/099,931, Non Final Office Action dated Jun. 3, 2016", 6 pgs.
"U.S. Appl. No. 15/099,931, Notice of Allowance dated Dec. 6, 2016", 8 pgs.
"U.S. Appl. No. 15/099,931, Preliminary Amendment filed May 26, 2016", 7 pgs.
"U.S. Appl. No. 15/099,931, Response filed Aug. 24, 2016 to Non Final Office Action dated Jun. 3, 2016", 7 pgs.
"U.S. Appl. No. 15/450,883, Final Office Action dated Oct. 13, 2017", 11 pgs.
"U.S. Appl. No. 15/450,883, Non Final Office Action dated Apr. 12, 2017", 9 pgs.
"U.S. Appl. No. 15/450,883, Notice of Allowance dated Feb. 14, 2018", 8 pgs.
"U.S. Appl. No. 15/450,883, Preliminary Amendment filed Apr. 6, 2017", 5 pgs.
"U.S. Appl. No. 15/450,883, Response filed Jan. 16, 2018 to Final Office Action dated Oct. 13, 2017", 7 pgs.
"U.S. Appl. No. 15/450,883, Response filed Jul. 10, 2017 to Non Final Office Action dated Apr. 12, 2017", 6 pgs.
"Archive Microsoft Office 365 Email I Retain Unified Archiving", Gwava, Inc., Montreal, Canada, [Online] Retrieved from the internet: <http://www.gwava.com/Retain/Retain_for_Office_365.php>, (2015), 4 pgs.
"Complaint for Patent Infringement", *Telinit Technologies, LLC* v. *Twilio Inc*, (Oct. 12, 2012).
"Ethernet to Token ring Bridge", Black Box Corporation, [Online] Retrieved from the internet: <http://blackboxcanada.com/resource/files/productdetails/17044.pdf>, (Oct. 1999), 2 pgs.
"Twilio Cloud Communications—APIs for Voice, VoIP, and Text Messaging", Twilio, [Online] Retrieved from the internet: <http://www.twilio.com/docs/api/rest/call-feedback>, (Jun. 24, 2015), 8 pgs.
Abu-Lebdeh, et al., "A 3GPP Evolved Packet Core-Based Architecture for QoS-Enabled Mobile Video Surveillance Applications", 2012 Third International Conference on the Network of the Future {Nof), (Nov. 21-23, 2012), 1-6.
Barakovic, Sabina, et al., "Survey and Challenges of QoE Management Issues in Wireless Networks", Hindawi Publishing Corporation, (2012), 1-29.
Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.
Kim, Hwa-Jong, et al., "In-Service Feedback QoE Framework", 2010 Third International Conference on Communication Theory. Reliability and Quality of Service, (2010), 135-138.
Matos, et al., "Quality of Experience-based Routing in Multi-Service Wireless Mesh Networks", Realizing Advanced Video Optimized Wireless Networks. IEEE, (2012), 7060-7065.
Mu, Mu, et al., "Quality Evaluation in Peer-to-Peer IPTV Services", Data Traffic and Monitoring Analysis, LNCS 7754, 302-319, (2013), 18 pgs.
Subramanya, et al., "Digital Signatures", IEEE Potentials, (Mar./Apr. 2006), 5-8.
Tran, et al., "User to User adaptive routing based on QoE", ICNS 2011: The Seventh International Conference on Networking and Services, (2011), 170-177.

\* cited by examiner

```
function distribute(work, agent) {

// if the agent has the prefered skills, return true
    if (work.language == 'english' and agent.english > 10) return true;
    if (work.language == 'spanish' and agent.spanish > 5) return true;

// otherwise, if the work has been waiting for more than 10m
    // evaluate with lower skill requirements
    if (work.waitTime > 600) {
        if (work.language == 'english' and agent.english > 5) return true;
        if (work.language == 'spanish' and agent.spanish > 2) return true;
    }
    //otherwise, this agent doesn't have the skills. return false
    return false;
}
```

FIGURE 3

```
// begin prioritization function based on caller value
function prioritize(work) {
    if (work.attributes.valueClassification == 'gold') {
        return work.priority + 20;
    }
    else if (work.attributes.valueClassification == 'silver') {
        return work.priority + 10;
    }
    else {
        return work.priority;
    }
} function distribute(work, agent) {
    // Central division English Retention queue for standard value callers
    if ( work.valueClassification == 'silver'
        && work.language == 'english' && agent.english > 10
        && work.segment == 'retention' && agent.retentionSkill > 15
        && work.region == agent.location ) {
        return true
    } else if (...) {
        // More distribution conditionals . . .
    } else {
        return false
    }
}
```

FIGURE 4

```
<workflow:state id="Queue to Jim">
  <enqueue timeout=30, priority=5.0>
    <target>Jim</target>
    <listen event=queue.timeout action="Bar">
  </enqueue>
</workflow:state>
<workflow:state id="Bar">
  <enqueue timeout=600 priority=5>
    <target exp="sale"/>
  </enqueue>
</workflow:state>
```

FIGURE 5

| Work Item Identifier | Akljg;9o |
|---|---|
| Account Identifier | Kl;lvk'ot |
| Primitive Group Identifier | L;aklg09 |
| Workflow Information | https://example.com/workflow_instruction_documents/document23.htm |
| Work Item Attributes | { "valueClassification": "gold"; "language": "English"; "Segment": "retention"; "region": "California"} |
| Work Item Age | 120 |
| Work Item Priority | 20 |
| Work Collection Identifier | "Work Collection 1" |
| Assignment Status | "Pending" |

FIGURE 11

```
function prioritize(work) {
   return work.priority;
}
```

FIGURE 12A

```
function prioritize(work) {
  if (work.attributes.spend > 10000) {
     return 10;
  }
  if (work.attributes.spend > 1000) {
      return 5;
  } return 0;
}
```

FIGURE 12B

```
function prioritize(work) {
  // if waiting longer than 5min
  // bump the priority by 10
  // and schedule another check in 300s.
  if (work.waiting >= 300) {
    work.scheduleRePrioritization(300);
    return work.priority + 10;
  } else {
    //otherwise, just return the original priority
    return work.priority;
  }
}
```

FIGURE 12C

```
Function distribute (work, worker) {
        return true;
}
```

FIGURE 12D

```
Function distribute (work, worker) {
        //if the worker has the preferred skills, return true
        if (work.loanguage == 'english' and worker.english >10) return true;
        if (work.loanguage == 'spanish' and worker.spanish >5)
                return workers.orderBy("Spanish").first;

//otherwise, if the work has been waiting for more than 10m
        //evaluate with lower skill requirements
        if (work.waitTime > 600) {
                if (work.language == 'english' and agent.english > 5) return true;
                if (work.language == 'spanish' and agent.spanish > 2) return true;
        }

//otherwise, this agent doesn't have the skills, and return false.
        return false;
}
```

SYSTEM AND METHOD FOR A WORK DISTRIBUTION SERVICE

CROSS-REFERENCE TO RELATED APPLICATIONS

This application is a continuation of U.S. application Ser. No. 15/450,883, filed 6 Mar. 2017, which is a continuation of U.S. application Ser. No. 15/099,931, filed 15 Apr. 2016, which is a continuation of U.S. application Ser. No. 14/659,332, filed 16 Mar. 2015, which claims the benefit of U.S. Provisional Application Ser. No. 61/953,562, filed on 14 Mar. 2014, all of which are incorporated in their entirety by this reference.

TECHNICAL FIELD

This invention relates generally to the platform as a service field, and more specifically to a new and useful system and method for a work distribution service in the platform as a service field.

BACKGROUND

Call centers and customer care centers today build complex infrastructure to manage distributing customer calls and requests to workers that can respond to the customers. In other industries, companies must build similar infrastructure to serve other problems of work distribution. Developing such infrastructure is costly to develop and maintain. Thus, there is a need in the platform as a service field to create a new and useful system and method for a work distribution service. This invention provides such a new and useful system and method.

BRIEF DESCRIPTION OF THE FIGURES

FIGS. 3-5 are exemplary workflow instruction documents according to example embodiments;

FIG. 11 is a representation of a data structure of an exemplary work item according to an example embodiment;

FIGS. 12A-C are representations of exemplary prioritization functions according to example embodiments;

FIGS. 12D-E are representations of exemplary distribution functions according to example embodiments;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for a Work Distribution Service

Figure 1:
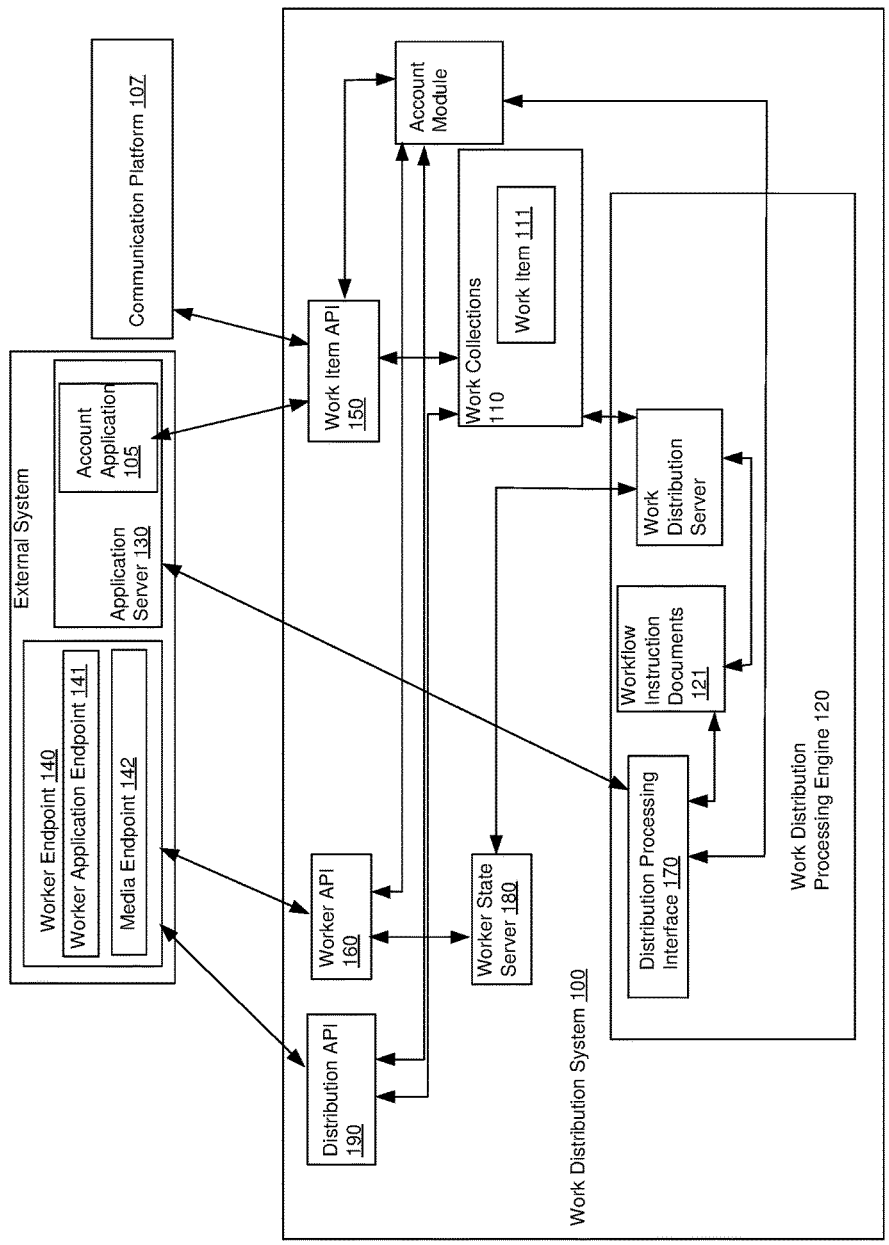
FIG. 1 is a schematic representation of a system according to an example embodiment.

As shown in FIG. 1, a system 100 for a work distribution service of a preferred embodiment can include a worker application programming interface (API) 160, a worker state server 180, a work item API 150, a set of work collections 110, and a work distribution processing engine 120. The system functions to manage and facilitate customized work distribution solutions. The system preferably enables outside developers to develop use-case specific implementations within the generalized framework of the system. The system can serve as a set of platform primitives and tools from which arbitrarily complex work distributions solutions can be built quickly and easily. The system preferably includes a number of input/output programmatic interface channels to connect workers with sources of work.

The system is preferably implemented as a work distribution service of a multi-tenant infrastructure. The system may alternatively be used as a single tenant instance (e.g., an on premise solution). As a single tenant implementation, the system preferably retains the flexibility provided in a similar multi-tenant version so that a developer can customize the single tenant implementation for a developer's own purpose. The system may additionally be implemented in combination with or in cooperation with a communication platform 107. The communication platform is preferably used in the execution of communications based applications. For example, the communication platform can facilitate execution of automated call logic such as in U.S. Pat. No. 8,306,021 issued on 6 Nov. 2012, which is hereby incorporated in its entirety by this reference. The system and/or a second communication platform may communicate over a variety of different communication protocols and mediums such as voice (e.g., PSTN, SIP, WebRTC, etc.), video, screen sharing, text messaging (e.g., SMS, proprietary IP based messaging, etc.), media messaging (e.g., MMS, proprietary IP based messaging, etc.), email, fax, and/or any suitable communications protocol. The system may alternatively be applied to any suitable problem with challenges in matching a work item to a worker that can work on the work item. For example, the system can additionally be applied to crowd sourced services such as vehicular ride-share platforms, service booking products, question/solution applications, and/or any suitable problem relating to the pairing of a pool of workers with worker requests.

As a multitenant infrastructure, the system can additionally include an account system within which an account record or records are stored to maintain individual account instance implementations. An account can include various operational settings and preferences. Also management of workers, work items, work distribution workflows, collections, and/or media can be scoped within an associated account. Herein, an account (or more specifically a developer account or managing account) defines the controlling account for at least one particular set of workflow for distributing work items to workers. The system preferably functions to allow a variety of different accounts address distinct work distribution problems in a flexible and customized manned.

The worker application programming interface (API) 160 of a preferred embodiment functions to enable a worker endpoint to interface with the system. Additionally, other suitable sources of worker related metadata may communicatively interface with the system through the worker API. For example, an external presence service may supply presence metadata about a set of workers. The worker API 160 is preferably a REST API but may alternatively be SOAP or any suitable type of API. Preferably worker status is maintained for each worker of each account instance that is instantiated and executing on the platform. The worker API 160 in one variation may be used over a realtime communication channel established between the system and a set of worker endpoints. The realtime communication channel can be a webRTC media channel, a websocket, or a channel using any suitable realtime communication protocol. The realtime communication channel may additionally integrate with a work distribution interface 190. A work distribution interface can be integrated within the worker API 160 or may alternatively be separate interface.

A worker endpoint 140 can include a worker application endpoint 141 and a media endpoint 142. A worker application endpoint is preferably a client application accessible by the system 100 over an internet protocol channel. The worker application endpoint 141 may be configured by an account holder to provide any suitable functionality. For example, user interfaces may be displayed allowing a worker to login, set status, display information relating to a current or past work item, append meta-data to the work item (to be saved internally or synchronized with the system), stream realtime worker attributes (e.g., geolocation information) or provide any suitable customized functionality. The worker application endpoint 141 can be a desktop application, a mobile application, an embedded application of a device (e.g., a wearable computer), or any suitable form of an application. In one variation, the worker application endpoint 141 may be provided by the system entity in part or whole. For example, a worker application SDK could be provided to facilitate easier integration with the system. Similarly, the functionality of the worker application endpoint 141 can be embedded within a separate application such as a client communication application used to make IP-based voice/video calls. As one example, the worker application endpoint 141 is used as a call center application—the application is used to connect and inform a worker about a current customer work request. In another example, the worker application endpoint 141 is a mobile application used by volunteer drivers within a car share program—the application is used to assign the driver to a customer requesting a ride.

The worker endpoint 140 can additionally include a media endpoint 142 such as a voice endpoint (e.g., a PSTN phone number or SIP address), video endpoint, screen-sharing endpoint, messaging endpoint (e.g., endpoint for SMS, MMS, or IP-based messaging), and/or any suitable type of media endpoint. In one variation, a client based media endpoint can be integrated directly into the worker application endpoint 141. The status of the media endpoint 142 may additionally be integrated with the worker API 160 such that status can be updated based on media endpoint activity. For example, when a worker ends a call and hangs up, the worker status can be set to available.

The worker state server 180 of the preferred embodiment functions to maintain and monitor worker status and properties. The worker state server 180 is preferably in communication with a worker endpoint (e.g., 140) through the worker API (e.g., 160). As described above, other information sources can interface with the system 100; the worker state server 180 can include additional interfaces to access the additional information sources. The worker state server 180 can store worker related information. Workers are preferably stored in association with a parent managing account that manages the account instance within the system 100. Multiple accounts each have independent pools or collections of workers. In one variation, a collection of workers can be made public or shared across accounts.

The work item API 150 of the preferred embodiment functions as an interface through which work items can be added to the system. A work item (e.g., the work item 111 of FIG. 1) is preferably a task or a request made on behalf of an account to be enqueued and serviced by a worker. Similar to the worker API 160, the work item API 150 is preferably a REST API but may alternatively be SOAP or any suitable type of API. The work item API 150 can be used to add, remove, read, and/or modify a work item. Modification to a work item can additionally be performed while the work item is in a collection. Additionally, the system can include a set of workflow related instructions, service calls, or other suitable mechanisms to trigger creating a work item on behalf of some object. The instructions can be executed during a related operation of the platform (e.g., handling or routing a phone call). If the workflow instruction (e.g., an instruction included in the workflow instruction document 121 of FIG. 1) is encountered, a work item can be added to a collection according to the parameters of the workflow instruction. When used in combination with a communication platform (e.g., 107 of FIG. 1), a work item can include a reference to a voice call, a video call, screensharing session, text message, media message, or any suitable type of media. A work item associated communication may be synchronous or asynchronous. The work item associated communication may additionally be incoming communication, established communication, or an outbound communication. Alternatively the work item can be made on behalf of any suitable object.

In one implementation, a work item (e.g., the work item 111 of FIG. 1) includes a set of attributes. At least some of the attributes may be defined for the particular use-case. The attributes can be characterized in a JSON object, and XML document, or any suitable data object descriptor. For example, work item can include any metadata related to the communication such as an originating phone number or endpoint address. The work item can include a reference to external media such as a current communication session (e.g., phone call or video chat session), an image, user-account profile, or any suitable type of media.

The set of work collections 110 of the preferred embodiment function to store pending work items (e.g., the work item 111). A work collection can have some natural priority and operational logic that define default behavior such as executing a first in first out type dequeuing methodology. The collection can be a queue, a bin, a set, a list, or any suitable collection. The collection is more preferably ordered in response to prioritization specified by the work distribution processing engine 120. The collection may alternatively be an unordered collection of work items.

The work distribution processing engine 120 of the preferred embodiment functions to process queued/added work items in coordination with the worker resources. The work distribution processing engine 120 can be triggered in response to work item activity (e.g., a new work item), worker activity (e.g., change in worker status), or collection status (e.g., volume of work items), and/or any suitable event. In a preferred embodiment, the work distribution processing engine works on a selected work item. The work distribution processing engine preferably includes a component to process a workflow instruction document. A workflow instruction document (e.g., 121 of FIG. 1) is preferably a script, an application file/object, set of configurations, or any suitable customizable set of instructions. The instructions can be used to define logic on how a particular work item is paired with a worker. The properties of the work item, the workers, and the status of the collection(s), may be used within the logic of the workflow instruction document. In a preferred variation, the work distribution processing engine 120 can include a component to retrieve a workflow instruction document from a remote server (e.g., the server 130 of FIG. 1). An externally retrieved workflow instruction document can enable external developers to use internal logic to dynamically customize the manner of prioritizing and assigning a work item to a worker. Alternatively, a workflow instruction document can be locally cached or stored. Account defined directives are processed to select a worker managed by the worker status server. The work distribution processing engine 120 or alternatively the system 100 can include a distribution interface (e.g., the distribution interface 190 of FIG. 1), which coordinates distribution of a work item.

2. Method for a Work Distribution Service

A method for a work distribution service of a preferred embodiment can include collecting worker status S100, adding work items to a collection S200, prioritizing work items in the collection through developer directives S300, and distributing a work item to a worker according to priority of the work item in the collection S400. The method functions to provide a set of programmable primitives and tools usable by a variety of applications to facilitate matching requests to entities that can fulfill the requests. The method is preferably applied in the case of matching user-based workers to work. One exemplary usage, would be for a customer service application pairing customers to company representatives. The method may alternatively be used in matching any two items. The workers are preferably characterized as being a limited resource such as people, businesses, machines, or any suitable entity capable of fulfilling a work item request. The method preferably utilizes a programmable worker interface (e.g., 160) through which information can be obtained from a worker and delivered to the worker; a programmable work item interface (e.g., 150) through which work items are added to the system; and a distribution processing engine interface (e.g., 170 of FIG. 1) used to apply defined logic on assigning work and prioritization.

The method is preferably implemented within a multi-tenant platform as described above, but may alternatively use any suitable system. When applying the method for a specific account instance within the platform, a single entity can control supplying the work items and the workers to fulfill the work requests. However, the flexibility of the method can enable any number of parties to participate within a single account instance. For example, one account instance of the method can allow work items to be retrieved from a plurality of different sources and parties (authenticated on behalf of the account), and similarly the pool of workers may come from yet another source or sources. The method functions to connect sources of work requests and workers to fulfill the work.

Herein, the method is described as it could be used in communications-based work distribution application (e.g., call centers, customer support applications, etc.), but the method may alternatively be applied more generally to any suitable application of assigning a work request to a pool of workers.

Block S100, which includes collecting worker status, functions to monitor and manage workers' capability to fulfill a work item. Block S100 preferably includes receiving worker status update through a worker API (e.g., 160). The worker API is preferably a REST API but may alternatively be SOAP or any suitable type of API. Preferably worker status is performed for each account instance that is instantiated and executing on the platform and for each worker of those account instances. Collecting worker status can further include establishing a realtime communication channel with a client application of a worker. The realtime communication channel can be communicated through webRTC, a websocket, or any suitable realtime communication protocol. In one variation, the realtime communication channel is used for pushing work items requests to a worker application endpoint in addition to collecting worker status. Additionally, worker status can be collected through secondary channels. For example, presence information can be obtained from an outside source. Outside sources are preferably associated with a worker through some unique identifier.

Worker status can be collected based on API calls (via API 160) made to a worker resource (of the worker sate server 180). A worker resource is preferably a data object, record, or set of data properties stored within an endpoint state server (e.g., 180). A worker resource can include a unique identifier, account properties, worker information, status, a status callback reference, group information, attributes, and/or any suitable properties. A unique identifier can be an alphanumeric code or any suitable identifying label to identify the worker when making calls. The account properties can include a secure identifier of the account or subaccount managing the work distribution instance. Worker information can include worker based information such as name, gender, and other suitable properties. The status property preferably defines the state of the worker. Status preferably includes at least two classes of state: available and unavailable. Other status states can include offline, online, idle, busy, and/or any suitable form of status. The status callback reference can include a URI and/or a method that defines a resource that can be notified upon status change in the status. The group information can include classification, labels, tags, or other associations to which the worker belongs. The group information can be used to map an organizational map to the worker such as which business department(s) the worker works under. The attributes property is preferably a customizable set of attributes. The attributes in one implementation are defined as a JSON object but may alternatively be an XML object or any suitable data interchange format. The properties within the attributes field can be arbitrarily set. For example, a customer service application may include a language field which can be set with a set of languages the worker can speak and the proficiency at each language, seniority level which can be set with a value indicating how junior or senior the worker is, and a skills field including tags for any special skills the worker may have. A worker resource can be updated at any suitable time. As mentioned above, a realtime communication channel may be established and used in updating worker attributes and/or other properties. As one example, a driver based application may continuously or frequently update the geolocation information of a driver by updating a location attribute. Any API calls made in the method can further include authenticating parameters, which are used to verify authenticity of the API calls.

In one implementation, the method could include providing a worker endpoint application (e.g., 140 of FIG. 1) and/or software development kit to facilitate connecting through the worker API 160. Providing a worker endpoint application can simplify the process of interacting with endpoint state server 180. The provided worker endpoint application can include a worker application endpoint (e.g., 141 of FIG. 1) and/or a media endpoint (e.g., 142 of FIG. 1). The worker application endpoint (e.g., 141 of FIG. 1) is preferably used in communicating worker status and receiving work items. Media related to assigned work items can be delivered to the media endpoint (e.g., 142 of FIG. 1). In the case of using the method in combination with a communications platform, the worker endpoint can be provided through a client communication SDK. The client communication SDK may be used in enabling voice, video, messaging, and/or other forms of communication through the SDK. The SDK could be extended to provide worker registration and status update functions.

Block S200, which includes adding a work item (e.g., 111 of FIG. 1) to a collection (e.g., 110 of FIG. 1), functions to enqueue/add work items before assigning them to a worker. A work item (e.g., 111) is preferably a data object that characterizes a body of work that can be fulfilled/serviced by a worker. The work item preferably includes a set of properties defining content and conditions of the request. In one implementation the work item includes a use-case defined attributes object (e.g., a JSON or other suitable data interchange format). A developer can include any suitable set of attributes and data architecture within the work item. These attributes may be used in the prioritization processing stage and/or within the worker endpoint (e.g., 140). The instruction and/or request to add the work item can specify a routing rule URI, which can be used in block S300 to determine the distribution directives.

In one preferred implementation, a work item represents an incoming or outgoing communication. If the work item is an asynchronous communication (e.g., an SMS, MMS, email, fax, IP message, and the like) then the contents of the communication may be included within a content attribute of the work item. If the work item is an incoming synchronous communication, the work item can include any metadata related to the communication such as an originating phone number or endpoint address, and the work item can include a reference to the media. Adding a work item to a collection may include holding, parking, or otherwise managing in-session, established media before being distributed to a worker. If the work item is made in association with a live customer call, then the customer call session can be set to be handled according to an application defined for that state of call waiting. In one variation, all work items are enqueued and processed before being assigned to a worker. In another variation, work items may be enqueued if there is no worker available—if a worker is available, the work request may be automatically distributed to an available worker. When adding the work item to a collection, the collection may be a default collection, but the collection may alternatively be a specified collection. Multiple collections may be maintained. The distribution processing stage can act on the different collections in any suitable manner.

In one variation, adding work items to a collection includes adding a work item through an application programming interface (e.g., the work item API 150 of FIG. 1). In an implementation, work items are added by an account application (e.g., the account application 105 of FIG. 1) of an external system or a communication platform (e.g., the communication platform 107 of FIG. 1). The interface is preferably a web API such a REST API, SOAP API, or any suitable type of API. Adding a work item can be added by an account posting to a work item endpoint, specifying attributes of the work item. In response to a request, the work item is created and added to a general or specified collection. A work item similar to a worker resource can include a unique identifier. In response, a request developer can receive information indicating the status of their request. Successfully adding a work item can result in a response indicating the successful addition of the work item and information about the created work item (e.g., a unique identifier). The unique identifier could be used to update the attributes of the work item while enqueued. For example, if the work item relates to traveling entity, the geolocation of the traveling entity could be a defined attribute, which is updated while enqueued.

As mentioned above, the work distribution platform may be implemented in combination with a communication platform (e.g., 107) and/or any suitable type of secondary platform. The secondary application may include functionality or a mechanism to execute or trigger application instructions. In the communication platform (e.g., 107), a set of telephony instructions can be used to instruct a communication router on how to interact and/or route the communication. The set of secondary platform instructions or triggers may include a work enqueue instruction. The enqueue instruction is used to trigger the queueing of a specified platform item. The enqueue instruction preferably results in a work item being generated and optionally a media item if required. For example, a telephone call may be handled within the communication platform (e.g., 107). At some point during the call an enqueue instruction may be encountered. The enqueue instruction can include properties such as a routing rule URI to fetch a workflow instruction document. The properties of the call can be packaged into a work item and added to a collection (e.g., by using the work item API 150). Additionally, the media of the call could be temporarily distributed to a wait-state application. The work item will include a reference to the communication session in the wait-state application. When distributed to a worker, the communication session is preferably transitioned to the worker.

Other suitable interfaces can be created to manage additional or alternative forms of interfacing with the collection of work items. For example, an email interface could be created wherein an account could direct inbound email messages through the email interface of the work distribution system, and the emails could be added as work items.

Block S300, which includes prioritizing work items in the collection through developer directives functions to apply work item ordering and selection. Block S300 is preferably invoked upon enqueueing or adding a work item. Alternatively, the enqueued work items can be polled periodically, upon worker status changes, or according to any suitable event. Prioritizing work items preferably includes processing queued work items according to the developer directives. The developer directives are preferably a set of workflow instructions defining workflow and logic in prioritizing, assigning, and/or distributing a work item to a worker. Developer directives are preferably included in a workflow instruction document—a workflow instruction document (e.g., 121 of FIG. 1) can be formed as a script, an application file/object, a markup language document defining logic, or any suitable mechanism for characterizing processing. The workflow instruction document can be formed through a set of different instruction primitives that can be used to define logic and actions taken for distributing work. Prioritizing work items preferably includes observing worker status. The state of a worker, a set of workers (e.g., set of available workers), of a work item, or a set of work items can be used as inputs to the workflow instruction document. In a preferred embodiment, the workflow instruction document is processed for a selected work item and the worker information can be referenced within the workflow instruction document. Alternative approaches may apply an alternative focus such as processing the workflow instruction document for each available worker wherein the set of workflow items can be referenced in the document. The workflow instruction document may be used to customize distribution approach between different account instances. More preferably, the workflow instruction document can enable dynamically adjusting distribution of work items based on a particular work item. As such, a workflow instruction document can be used to serve a variety of use cases. For example, a workflow may be designed to distribute work according to worker (agent) language skills as shown in FIG. 3. In some variations, distribution heuristics and rules may be internal and fixed within the system, some may be configured behavior through account settings, and others could be uniquely defined within a workflow instruction document. In one variation, a workflow instruction document can include a function defining prioritization of the work item for selection within the collection and a function defining distributing a selected work item.

One type of heuristic is distribution prioritization, which may be based on origin of a work item (e.g., who is the work item for), the history of the work item (e.g., how long has the work item been queued, how many times has it been queued), worker properties, or any suitable type of prioritization. In an example of user-prioritization, work items can be prioritized based on the user profiles associated with the work items. The user profiles in this example can be customers of a developer account. As an example, there may exist three tiers of user profiles: free, basic plan, and premium plan. The work requests items can be prioritized in order from highest to lowest as premium, basic, and free through customizing a workflow instruction document as shown in FIG. 4. As an example of a history prioritization, work items could be prioritized according to wait-time. This heuristic may be combined with the user-type prioritization to prevent lower priority work items from suffering excessively long amounts of time when there is a high volume of higher user-priority work items. Workers may be similarly prioritized. In one example, a worker can be assigned to two groups for example a sales group and a support group. If the worker specialized in sales, then the worker is prioritized for sales related work requests, but if no sales work items are queued, then the worker can serve support related work requests. Such worker prioritization can improve utilization of worker resources. In one other example, prioritizing work can include prioritizing worker selection based on idle time of a worker, which functions to more evenly distribute work across workers.

As another heuristics, prioritization can apply expanding targets, which functions to attempt to match each work item with the best worker while ensuring the service level targets are met consistently. As shown in FIG. 5, the expanding targets can attempt a top priority target for a first period, then the target worker is expanded for a next if the work item is not serviced in the first period. The target can continue to expand until a default or widest target is used. Expanding targets can be customized to a particular user profile associated with the work item to direct the work item to an individually assigned worker. For example, a user making a call to a banking customer service center may have an assigned financial advisor. The financial advisor could be set as the initial target for that call.

Figure 6:
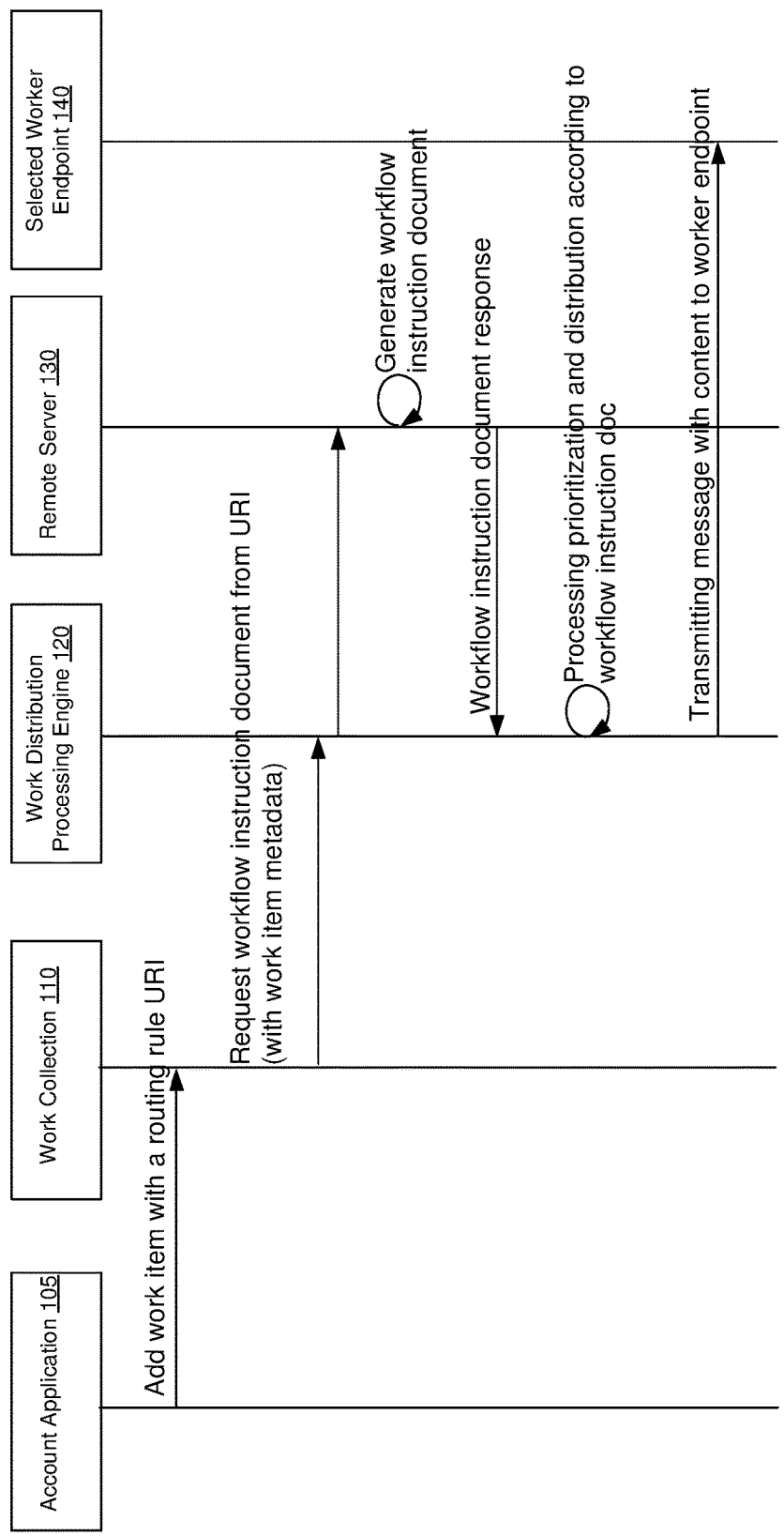
FIG. 6 is a communication flowchart of retrieving a workflow instruction document according to an example embodiment.

In one variation, the workflow instruction document is a local configuration. An account, prior to use of the method, can set a workflow instruction document or otherwise define the sorting directives. A pre-defined workflow instruction document can be used globally within an account instance. The pre-defined workflow instruction may alternatively be assigned to a particular collection, to work items with a particular property, or assigned in any suitable manner. In another variation, the workflow instruction document is preferably retrieved in an external application server (e.g., one controlled and operated in accordance with an account holder) through a remote procedural call (RPC) type request and response model. As shown in FIG. 6, metadata around the work item, the collection, and/or the workers is preferably sent to a specified routing rule URI. The URI preferably references an application server of the entity associated with the account instance. The application server preferably uses internal state information, performs any suitable API requests back to the workflow distribution system, and generates a workflow instruction document. The workflow instruction document is returned to the work distribution processing engine. In one variation, an account instance can be selectively configured for local storage of the directives or to retrieve the instructions from an external resource.

In alternative embodiments, the method may be implemented without granular customization of prioritization. The work distribution processing engine can use internal prioritization heuristics such as those mentioned above. A set of prioritization hooks could be built into the work distribution processing engine such that an account instance could selectively invoke different heuristics.

Block S400, which includes distributing a work item to a worker according to priority of the work item in the collection functions to deliver a work item to a worker endpoint. In response to the prioritizing of work items, a pairing of a work item and a worker is preferably selected. The selection is preferably based upon the defined logic of selecting a targeted worker. When a pairing of a work item and worker is established, the work item is delivered to the worker endpoint. As mentioned above, a worker application endpoint (e.g., 141) can have an established realtime communication channel to the work distribution system 100. The work item (e.g., 111) and the associated properties are preferably pushed or otherwise transmitted to the worker application endpoint (e.g., 141). In some variations, the work item (e.g., 111) may be delivered to a media endpoint (e.g., 142) in addition to or instead of a worker application endpoint (e.g., 141). In one variation, the work item of an asynchronous communication can include the media content of the associated communication. The media content could be transmitted to the worker application endpoint 141, but the media content may alternatively be delivered over the original medium as the incoming communication or over any suitable protocol. For example, an inbound SMS message to a customer service center is queued as a work item containing a content property indicating the SMS content. When a worker is assigned to the work item, the SMS content can be detected and the work item is delivered as an SMS message. In another variation, a work item can include a reference to external media content. The external media content can be simultaneously transmitted to a media endpoint 142 of a worker. For example, an incoming phone call to a customer service center triggers a creation and queuing of a work item, the caller is directed to a wait-state application to handle the call session while waiting for assignment to a worker. When a worker is selected, the work item and related metadata may be delivered to a worker application endpoint 141, and the caller is redirected and connected with a media endpoint 142 of the worker. In the case of outbound communications associated with a work item, the intended destination is preferably characterized in the properties of the work item. When the work item is delivered to the worker application endpoint 141, a communication can be established with the destination endpoint. Alternatively, both the worker and the destination can be called and merged.

If work item is distributed to a worker, but the worker does not respond to the work item, the method may include redistributing the work item and updating the worker status. For example, if a call associated with a work item is directed to the worker, but the worker never picks up or responds to the call, the status of the worker can be updated to 'not ready'. The worker may be required to update status again before being assigned to a work item. In another variation, a nonresponsive callback may be defined so that the response can be developer defined.

In some cases, a worker may be unable to complete or fully fulfill the work item. The worker endpoint could be configured to enable a work item to be returned or re-entered in the system to be redistributed. In one variation, the work item could be programmatically added as a new work item preferably with attributes to indicate how to better distribute the work to a more qualified worker. However, the work item may be re-entered (e.g., with the same work item), wherein the method automatically weights the prioritization of distributing the work item to a qualified worker. The workflow instructions can include mechanisms that can be applied to logging such as marking preference level for different work distribution options.

Additionally the method may include work distribution logging, which functions to collect and provide access to worker, work, and collection analytics. Logging can record individual worker statistics (e.g., number of work items, rate of work items, distribution of types of work items), success of routing (e.g., are work items distributed to preferred, secondary, or last-resort workers), collection statistics (e.g., utilization capacity, distribution of work item properties), and/or any suitable type of information.

3. System for a Multi-Tenant Work Distribution Platform

Figure 7:
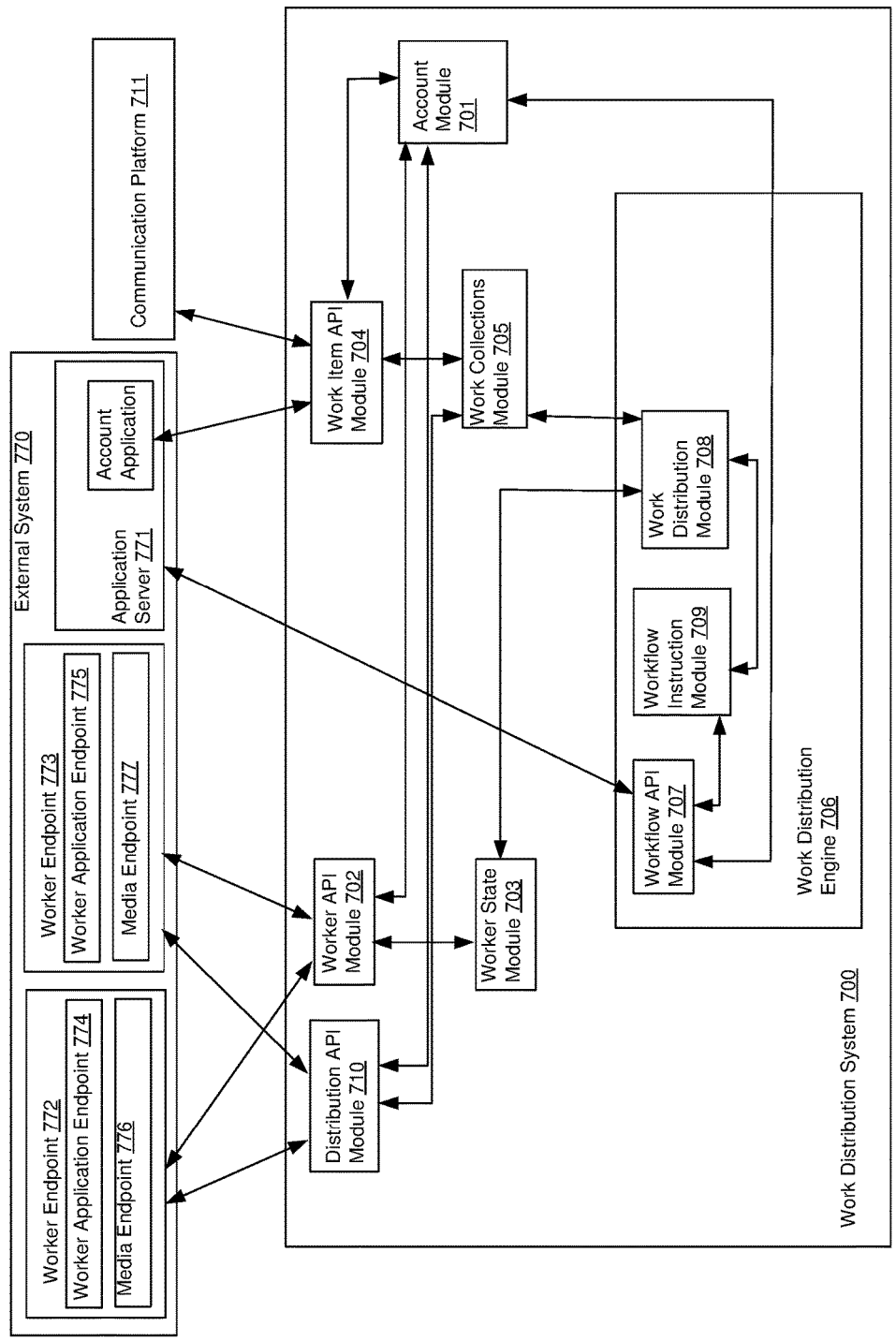
FIG. 7 is schematic representation of a system according to an example embodiment.

FIG. 7 is a schematic representation of a work distribution system 700 for a multi-tenant work distribution platform, according to an example embodiment. The system 700 is similar to the system 100 of FIG. 1.

Multi-Tenant

The system 700 provides a multitenant platform meaning that the work distribution platform can be used for the processing of one or more applications of a plurality of external systems. Each external system (e.g., 770) has at least one work distribution account at the system 700. For example, a call center service provider, CRM service provider, and a vehicular ride-share platform can each have work distribution accounts at the system 700. As another example, multiple different call center service providers can each have work distribution accounts at the system 700. As yet another example, a vehicular ride-share service, a service booking platform, and a question/solution application can each have work distribution accounts at the system 700. In the example embodiment of FIG. 7, an external system can have multiple work distribution accounts. For example, an external system that has multiple business units (e.g., sales and customer support) can add a work distribution account for each of the business units. In the example embodiment, an external system can add sub-accounts to each one of its work distribution accounts. For example, a call center system provider can add a sub-account to its work distribution account for each of the call center system provider's customers. By providing sub-accounts to its customers, the call center system provider can allow its customers to manage work distribution for their respective call center application instances. Management of accounts and sub-accounts authorization for account management access, billing for account use, and fraud detection is provided by a multitenant account module (e.g., the multi-tenant account module 701). The foregoing examples are not intended to be limiting. Any type of external system can have any combination of accounts and sub-accounts at the system 700.

Modules

As shown in FIG. 7, the system 700 includes a multi-tenant account module 701, a worker API module 702, a worker state module 703, a work item API module 704, a work collections module 705, a work distribution engine 706, and a distribution API module 710.

In the example embodiment of FIG. 7, the worker API module 702 functions similarly to the worker API 160 of FIG. 1, the worker state module 703 functions similarly to the worker state server 180 of FIG. 1, the work item API module 704 functions similarly to the work item API 150 of FIG. 1, the work distribution engine 706 functions similarly to the work distribution processing engine 120 of FIG. 1, the work collections module 705 manages work collections similar to the work collections 110 of FIG. 1, and the distribution API module 710 functions similarly to the work distribution interface 190 of FIG. 1.

In the example embodiment of FIG. 7, the modules (e.g., 701, 702, 703, 704, 705, 706 and 710 of FIG. 7) include instructions that are executed by any combination of one or more processing units. In the example embodiment, each processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, one processing unit includes the account module 701 the worker API module 702, the worker state module 703, the work item API module 704, the work collections module 705, the work distribution engine 706, and the distribution API module 710. In some embodiments, a plurality of processing units include the account module 701, the worker API module 702, the worker state module 703, the work item API module 704, the work collections module 705, the work distribution engine 706, and the distribution API module 710. In some embodiments, one processing unit includes one of at least one of the account module 701 the worker API module 702, the worker state module 703, the work item API module 704, the work collections module 705, the work distribution engine 706, and the distribution API module 710. In some embodiments, one processing unit includes a plurality of at least one of the account module 701, the worker API module 702, the worker state module 703, the work item API module 704, the work collections module 705, the work distribution engine 706, and the distribution API module 710. In some embodiments, the one or more processing units are included in one or more server devices.

External Systems

The system 700 is communicatively coupled to at least a first external system 770 via the worker API module 702, the work item API module 704, and a workflow API module 707 of the work distribution engine 706. In an implementation, the external system 770 is communicatively coupled to the system 700 via the distribution API module 710.

In the example embodiment, the external system 770 is at least one of a customer service system, a CRM system, a call center system, a service provider system, a vehicular rideshare system, a service booking system, a question/solution system, and any other type of external system that pairs a pool of workers with worker requests.

The external system 770 includes an application server 771 and worker endpoints 772 and 773. In the example embodiment, the worker endpoints 772 and 773 are similar to the worker endpoint 140 of FIG. 1.

The worker endpoints 772 and 773 each correspond to a respective worker of the external system 770. In an implementation, each of the worker endpoints 772 and 773 include a worker application endpoint (e.g., 774, 775) and a media endpoint (e.g., 776, 777). In the example embodiment, the worker application endpoints 774 and 775 are similar to the worker application endpoint 141 of FIG. 1, and the media endpoints 776 and 777 are similar to the media endpoint 142 of FIG. 1.

In an implementation, each of the worker endpoints 772 and 773 is associated with at least one processing unit that stores and executes machine-readable instructions of a worker application (e.g., 1916 of FIG. 19) associated with the worker application endpoint and a media application (e.g., 1917 of FIG. 19) associated with the media endpoint of the worker endpoint. In some implementations, at least one processing unit of the respective endpoint (e.g., 772, 773) is included in one of a mobile device, a computer, a server, a wearable device, or any suitable type of device. In some implementations, worker endpoints do not include a media endpoint.

In the example embodiment, worker application endpoints include at least one of a Websocket Server Endpoint, a REST API endpoint of the distribution API 190, and an WebRTC datachannel. In the example embodiment, media endpoints include at least one of a PSTN endpoint, a SIP endpoint, and a WebRTC datachannel. In some embodiments, endpoints include e-mail addresses.

Multi-Tenant Account Module 701

The multi-tenant account module 701 functions to manage work distribution accounts of the system 700, provide authorization for account management access to access a work distribution account, bill for account use, and perform fraud detection. In the example embodiment, the account module 701 is constructed to manage account records for accounts and sub-accounts of each of the external systems of the work distribution platform (of the system 700). The account module 701 is constructed to provide authorization for account management access, billing for account use, and fraud detection. The account module 701 associates operational settings and preferences for each account record, including work distribution settings and preferences. The account module 701 associates at least one set of work distribution primitives with each account record. In the example embodiment, work distribution primitives include: 1) workers, 2) work items, 3) work distribution workflows, and 4) work collections.

An account holder (e.g., an external system having an account, or a user of the external system having a sub-account) configures and manages the work distribution primitives by using at least one of the worker API module 702, the Work Item API Module 704, and the Workflow API Module 707. In the example embodiment, an account holder configures work collections by using the workflow API Module 707. In some embodiments, an account holder configures work collections by using an API for the work collections.

In some embodiments, sets of work distribution primitives for an account are organized into primitive groups. In such embodiments, an account can have multiple primitive groups, with each primitive group having a set of workers, work items, work distribution workflows and work collections. In some embodiments, sets of work distribution primitives for an account are organized into workspaces. In such embodiments, an account can have multiple workspaces, with each workspace having a set of workers, work items, work distribution workflows and work collections.

In the example embodiment, API call requests received by the worker API module 702, the work item API module 704, and workflow API module 707 include authenticating parameters, which are used by the system 700 to verify authenticity of the API call requests. In an implementation, API call requests received by the worker API module 702, the work item API module 704, and workflow API module 707 each specify an account ID and a corresponding authentication token, and the respective module uses the account module 701 to authenticate the API call request.

In an implementation, the account module 701 uses the account ID of each API call request to bill the respective account for account use on a per API call basis.

In an implementation, the API call requests are HTTP requests.

Sub-Accounts

The account module 701 manages sub-accounts such that a hierarchy of accounts can be created. In an implementation, a work distribution account (e.g., a parent account) can create or contain multiple work distribution sub-accounts (e.g., children accounts). In an implementation, sub-accounts are created through an interface by the sub-account holder or alternatively through an API by the parent account holder. For example, an application developer may create a customer service application, and then allow end users to sign-up as customers within the developer's parent work distribution account. In an implementation, the work distribution sub-accounts operate within the scope of the parent account. In an implementation, the sub-accounts are customized by the parent account and/or customized by sub-account holder.

Fraud Detection

In the example embodiment, the account module 701 monitors, measures, and detects instances of illicit use that occur within or through the work distribution system 700. In some embodiments, a fraud scoring system monitors, measures, and detects instances of illicit use that occur within or through the work distribution system 700.

The account module 701 monitors API call requests received by the worker API module 702, the work item API module 704, and workflow API module 707 to detect fraudulent API call requests.

In an implementation, the account module 701 receives work distribution account (and sub-account) usage data (e.g., API calls), calculates a fraud score from the usage data block, detects when fraud scores of an account satisfy a fraud threshold, and takes action when a fraud score satisfies a fraud threshold block.

In an implementation, the account module 701 performs fraud detection in a manner similar to that described in U.S. Pat. No. 8,737,962, issued 27 May 2014, which is hereby incorporated in its entirety by this reference.

In an implementation, the account module 701 processes usage data to generate a metric that reflects the likelihood that illicit use of the system 700 is occurring. Fraud scores are preferably calculated for a set of fraud rules. The set of fraud rules are used to calculate a set of fraud scores (e.g., measure or indicators of fraud). Additionally, fraud thresholds can define when particular types of actions are taken. A fraud rule preferably includes a usage condition, a usage data time window, and an account age condition. The fraud rules may additionally be conditions within a single account or pattern conditions across multiple accounts. The usage conditions are particular patterns in usage data (e.g., account configuration or API call history). The usage conditions are preferably particular patterns such as some threshold on the number or percentage of events or resources that would trigger activating the fraud rule (e.g., assigning the defined fraud score for that rule). The usage condition can additionally specify conditions found across multiple accounts. For example, a usage condition may be for identical/corresponding billing information configured in more than three accounts. The usage data time window is the window that is used to define what data is analyzed. Some exemplary time windows could include the past 24 hours, the past week, the past month, the past year, or across all data (e.g., no time window). The account age condition may define for how long the rule is monitored for an account. Some illicit use scenarios may only be seen with new accounts. For example, the account age condition may configure a fraud rule to apply to an account for the first week after the account is created. If the conditions of the fraud rule are satisfied a defined score is preferably assigned. These fraud scores are preferably stored per account. If the fraud rule is defined for condition patterns across multiple accounts, the fraud score is preferably assigned to each account. The fraud score is preferably a numeric value but may alternatively be a label or any suitable construct to communicate fraud likelihood. In the example embodiment, high fraud scores indicate a greater likelihood of illicit use. In some embodiments, any suitable relationship may be defined between fraud scores and likelihood of illicit use. A fraud score is preferably associated with at least one key/identifier. The key may be an account, sub-account, an endpoint (e.g., a phone number), a credit card hash, or any suitable key. A plurality of fraud scores (e.g., one per fraud rule) is preferably calculated to monitor various entities and approaches to performing fraud in the system 700. For example, a series of fraud scores may be calculated to monitor accounts for one form of fraudulent API calls, while another series of fraud scores may be calculated to monitor credit card abuse across accounts. The fraud score is preferably indicative of activity during a specified time window, but may alternatively be an aggregate value (preferably factoring in older fraud scores to reflect multiple time windows). Calculation of fraud scores may additionally involve creating associations between subsets of the received usage data. Associations can be made based on user accounts, credit cards used to pay for accounts, endpoints or endpoint prefixes, source or destination carriers, and/or any suitable parameter that can be used to associate various data points in the usage data.

In the example embodiment, the account module 701 takes action reacting to fraud scores that indicate illicit behavior. The reaction to a fraud score may include flagging the account, throttling API call requests (or other platform usage requests) of an account, requesting additional billing information, notifying account holder, notifying an analyst of the work distribution platform, performing additional fraud detection analysis on the account, blocking particular actions on the account, or performing any suitable action. In a sub-account variation, the parent account of a sub-account is preferably notified of the sub-account illicit behavior. The notification can be an email notification, a message within a work distribution platform web platform, or notification made through the API of the work distribution platform. Account holders may have multiple sub-accounts using their service provided on top of the work distribution platform. By performing the fraud regulation by sub-accounts, the work distribution platform can avoid taking action against the parent account itself since many sub-accounts may be using the work distribution platform in a proper manner. This functions to simplify and abstract the fraud prevention aspect away from parent account holders such that the work distribution platform can handle illicit use detection.

In an implementation, the account module 701 includes a set of fraud rules (e.g., a rule set) stored using any suitable schema. The rule set preferably enables various heuristics to be configured and/or updated to keep current with the latest fraud attempts. Fraud score patterns may include thresholds for a particular fraud score or alternatively a group of fraud scores. Rule sets may be dependent on measured metrics in combination with a threshold, time period for the metrics, and account age. Alternatively, any suitable parameters may be specified to determine a rule set. Fraud score patterns may alternatively be trending patterns from a time series of related fraud scores. Fraud reactions preferably include suspending an account, blacklisting credit card numbers, blacklisting application URI's or IP's, rate-limiting services provided to an offending account, remove or adjust services provided to an offending account, flag the account for a human fraud analyst to investigate, and/or any suitable course of action. There may additionally be different level of responses based on the severity of the fraud score, and fraud reactions may be applied in stages if the fraud score does not subside.

Work Distribution Account Records

Figure 14:
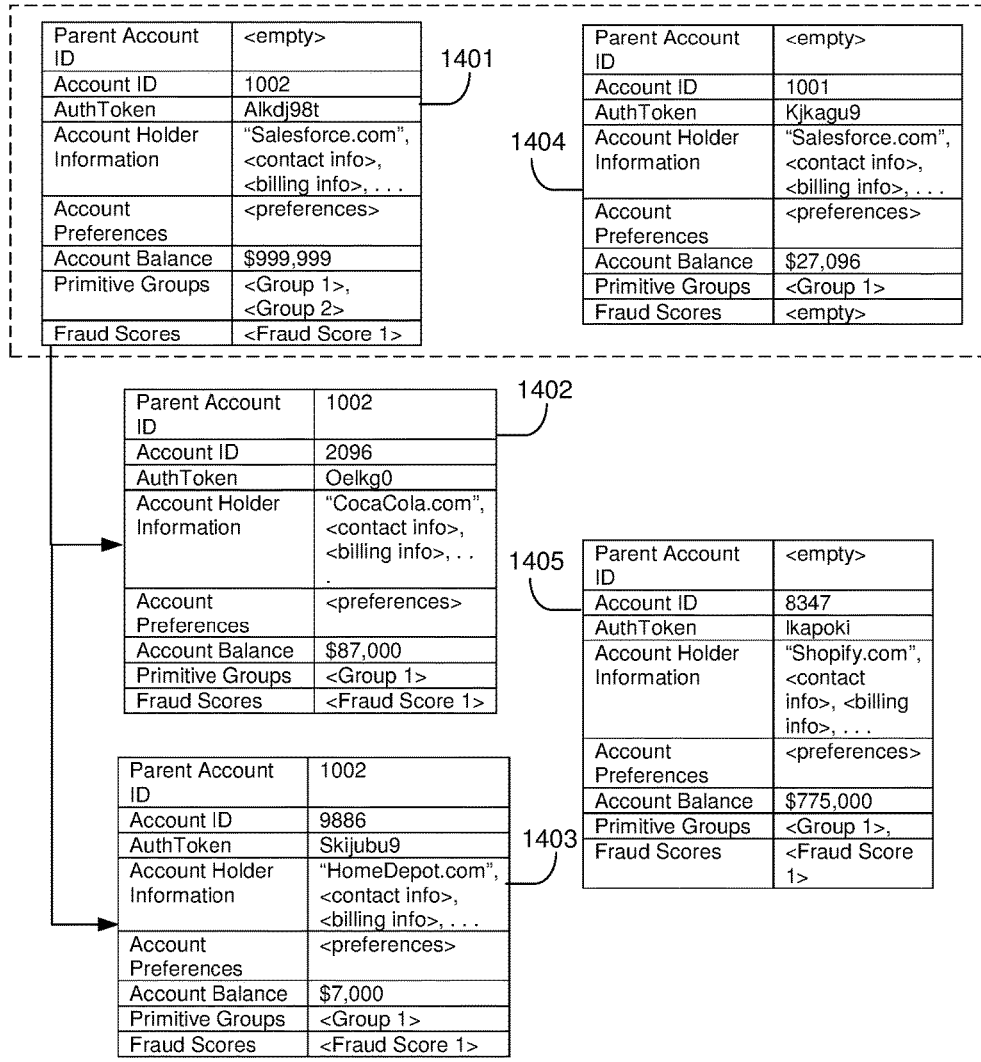
FIG. 14 is a representation of exemplary account records managed by a multi-tenant account module according to an example embodiment.

In the example embodiment, each work distribution account record includes the following fields: 1) Parent Account ID, 2) Account ID, 3) Authentication Token, 4) Account Holder Information, 5) Account Preferences, 6) Account Balance, 7) Primitive Groups, and 8) Fraud Scores. For parent accounts, the Parent Account ID is empty. For sub-accounts, the Parent Account ID indicates the parent account. The Account ID and the Authentication Token are compared with an Account ID and an Authentication Token of a received API call request to authenticate the request. Account Holder Information includes information such as, for example, account holder name, account holder contact information, account holder billing information, and the like. Account preferences include any operational settings and preferences, and work distribution settings and preferences of the account holder. Account Balance indicates billing charges for the account holder's use of the work distribution system 700, including charges for each billable API call request. Primitive Groups indicate the primitive groups configured for the account holder. In implementations in which the work distribution system uses workspaces instead of primitive groups, the account record indicates workspaces configured for each account holder. Fraud Scores indicates fraud scores calculated by the account module 701 for the account holder. FIG. 14 depicts exemplary account records managed by the multi-tenant account module 701. As shown in FIG. 14, account records 1401 and 1404 are associated with the same account holder. The account record 1401 has two sub-accounts 1402 and 1403. The sub-accounts 1402 and 1403 are associated with customers of the account holder of the account record 1401. The account holder of account records 1401 and 1404 is associated with an external system (e.g., "Salesforce.com"). The account holder of sub-account record 1402 is associated with a second external system (e.g., "CocaCola.com") and the account holder of sub-account record 1403 is associated with a third external system (e.g., "HomeDepot.com"). The account holder of account record 1405 is associated with a fourth external system (e.g., "Shopify.com").

Worker API Module 702

The worker API Module 702 functions to provide a Worker API that is used by an external system (e.g., 770) to manage workers of a specified account.

Configuration and state of each worker is managed by the worker state module 703 in association with a corresponding account or sub-account. In the example embodiment, the external system uses the Worker API to configure worker attributes for each worker. In the example embodiment, a worker application associated with a worker application endpoint (e.g., 141 of FIG. 1, 774 and 775 of FIG. 7) of the external system 770 uses the Worker API to provide a worker state of a worker associated with the worker application endpoint. In the example embodiment, the Worker API is a REST API.

The Worker API Module 702 is constructed to process requests received from an external system (e.g., 770) to add a worker to the work distribution system 700, and requests received from an external system to remove a worker from the work distribution system 700, read a worker resource (stored in the worker state module 703) of a worker, and update a worker (e.g., update worker status, update worker attributes).

In the example embodiment, API call requests received by the worker API module 702 include authenticating parameters, which are used by the system 700 to verify authenticity of the API call requests. In an implementation, API call requests received by the worker API module 702 specify an account ID and a corresponding authentication token, and the worker API module 702 uses the account module 701 to authenticate the API call request.

Table 1 shows the API call requests (and the corresponding parameters) that are processed by the worker API module 702, in accordance with an implementation.

As shown in Table 1, in an implementation, the Add Worker API call request includes the optional parameter <Primitive Group Identifier> to specify a Primitive Group Identifier for the added worker. In an implementation, the work distribution system 700 automatically assigns a Primitive Group Identifier for the added worker based on Account Preferences of the work distribution account specified by the <Account Identifier> parameter.

TABLE 1

Worker API

| WORKER API CALL REQUEST | PARAMETERS |
| --- | --- |
| Add Worker | <Worker Name>, <Worker Attributes>, <Account Identifier>, <Authentication Token>, (Optional Parameters: <Primitive Group Identifier>) |
| Remove Worker | <Worker Name>, <Account Identifier>, <Authentication Token> |
| Read Worker Resource (managed by the Worker State Module 703) | <Worker Name>, <Account Identifier>, <Authentication Token> |
| Update Worker Status | <Worker Name>, <Worker Status>, <Account Identifier>, <Authentication Token> |
| Update Worker Attributes | <Worker Name>, <Worker Attributes>, <Account Identifier>, <Authentication Token> |

Worker State Module 703

The worker state module 703 functions to receive worker state for an associated account (or sub-account) via the worker API Module 702, and manage received worker state of each worker in association with the corresponding account (or sub-account). The worker state module 703 functions to provide worker state during assignment of workers to work items.

The worker state module 703 collects worker state and stores collected worker state for a worker in a respective worker resource, as described for block S100.

In an implementation, each worker resource includes the following information: 1) Worker Identifier, 2) Account Identifier, 3) Primitive Group Identifier, 4) Worker Name, 5) Worker Attributes, 6) Worker Status, 7) Worker Idle Time.

Work Item API Module 704

The work item API Module 704 functions to provide a Work Item API that is used by an external system (e.g., 770 of FIG. 7) to add work items to the work distribution system 700 for a specified account. In the example embodiment of FIG. 7, work items are similar to the work item 111 as described above for FIG. 1.

In the example embodiment, the work item API module 704 (in conjunction with the work collections module 705) adds work items to a collection, as described for block S200 of FIG. 1.

The work item API Module 704 is constructed to process requests received from an external system to add work items to the work distribution system 700, and requests received from an external system to remove, read, and modify work items included in the work distribution system 700.

In the example embodiment, an external system adds a work item by sending a Work Item API ADD request to the work distribution system 700. The ADD request specifies an account (or sub-account), work item attributes, and workflow information. In an implementation, the work collections module 705 stores work item resources for each added work item. In an implementation, a work item resource is at least one of a data object, record, or set of data properties stored within the work collections module 705. In an implementation, each work item resource includes the following information: 1) Work Item Identifier, 2) Account Identifier, 3) Primitive Group Identifier, 4) Workflow Information, 5) Work Item Attributes, 6) Work Item Age, 7) Work Item Priority, 8) Work Collection Identifier, and 9) Assignment Status.

In an implementation, the Work Item Identifier is a unique identifier assigned to the work item by the work distribution system 700. The Account Identifier and the Primitive Group Identifier identify the work distribution account and the primitive group, respectively, associated with the work item. The Workflow Information indicates the workflow information provided for the work item in the Work Item API ADD request that adds the work item to the system 700. The Work Item Attributes indicates the work item attributes provided for the work item in the Work Item API ADD request that adds the work item to the system 700. The Work Collection Identifier identifies the work collection to which the work distribution system 700 has added the work item. The Work Item Age indicates an amount of time the work item has resided in the work collection identified by the Work Collection Identifier. The Work Item Priority indicates the priority value assigned to the work item. In an implementation, if no priority has been assigned to the work item, the Work Item Priority is empty. The Assignment Status indicates the status of assignment of the work item to a worker of the system 700. In an implementation, the Assignment Status indicates one of the following states: 1) the work item is waiting to be assigned to a worker, 2) a worker of the system 700 has been assigned to the work item, but the worker has not yet confirmed receipt of the work item, and 3) a worker has been assigned to the work item and the worker has confirmed receipt of the work item, and 4) the work item has been cancelled before being assigned a worker. In an implementation, in a case where a worker has been assigned to the work item, the Assignment Status indicates the assigned worker.

In the example embodiment, work item attributes are used to prioritize the work item and allocate a worker to the work item. In the example embodiment, work item attributes are also used at worker endpoints (e.g., 140 of FIG. 1, 772, 773 of FIG. 7) during processing of the work item by a worker corresponding to the worker endpoint.

In an implementation, the work distribution system 700 uses the workflow information to access a workflow instruction document of the external system (e.g., 770) that added the work-item. The work distribution platform 700 uses the workflow instruction document to assign a priority to the work item and to assign a worker to the work item. In an implementation, the workflow information is a URI that identifies a resource at the external system (e.g., 770) that provides the workflow instruction document for the added work item.

In an implementation, the work collections module 705 stores work collection resources for each added work collection. In an implementation, a work collection resource is at least one of a data object, record, or set of data properties stored within the work collections module 705. In an implementation, each work collection resource includes the following information: 1) Work Collection Identifier, 2) Account Identifier, 3) Primitive Group Identifier, and 4) Work Collection Name.

In an implementation, the Work Collection Identifier is a unique identifier assigned to the work collection by the work distribution system 700.

In the example embodiment, API call requests received by the work item API module 704 include authenticating parameters, which are used by the system 700 to verify authenticity of the API call requests. In an implementation, API call requests received by the work item API module 704 specify an account ID and a corresponding authentication token, and the work item API module 704 uses the account module 701 to authenticate the API call request.

Table 2 shows the API call requests (and the corresponding parameters) that are processed by the work item API module 704, in accordance with an implementation.

TABLE 2

Work Item API

| WORK ITEM API CALL REQUEST | PARAMETERS |
| --- | --- |
| Add Work Item | <Work Item Attributes>, <Workflow Information>, <Account Identifier>, <Authentication Token>, (Optional Parameters: <Work Collection Identifier>, <Primitive Group Identifier>) |
| Remove Work Item | <Worker Item Identifier>, <Account Identifier>, <Authentication Token> |
| Read Work Item Resource (managed by the Work Collections Module 705) | <Worker Item Identifier>, <Account Identifier>, <Authentication Token> |
| Update Work Item Attributes | <Worker Item Identifier>, <Worker Attributes>, <Account Identifier>, <Authentication Token> |
| Update Work Item Assignment Status | <Worker Item Identifier>, <Worker Assignment Status>, <Account Identifier>, <Authentication Token> |
| Add Work Collection | <Work Collection Name>, <Account Identifier>, <Authentication Token>, (Optional Parameters: <Primitive Group Identifier>) |
| Remove Work Collection | <Worker Collection Identifier>, <Account Identifier>, <Authentication Token> |
| Read Work Collection Resource (managed by the Work Collections Module 705) | <Work Collection Name>, <Account Identifier>, <Authentication Token> |

In an implementation, the work distribution system 700 responds to a Work Item API ADD request by providing the requestor (e.g., the external system 770) with a Work Item Identifier in the case of a successful ADD operation, or an error message in a case of an unsuccessful ADD operation.

In an implementation, the Add Work Item API call request includes the optional parameters <Work Collection Identifier> and <Primitive Group Identifier> to specify one or both of a Work Collection Identifier and a Primitive Group Identifier for the added work item. In an implementation, the work distribution system 700 automatically assigns a Work Collection Identifier and a Primitive Group Identifier for the added work item based on Account Preferences of the work distribution account specified by the <Account Identifier> parameter.

In an implementation, the Add Work Collection API call request includes the optional parameter <Primitive Group Identifier> to specify a Primitive Group Identifier for the added work collection.

In an implementation, the work distribution system 700 automatically assigns a Primitive Group Identifier for the added work collection based on Account Preferences of the work distribution account specified by the <Account Identifier> parameter.

Work Collections Module 705

In the example embodiment, the work collections Module 705 functions to manage sets of work collections of all accounts and sub-accounts of the work distribution system 700. In an implementation, a set of work collections is a primitive group. In an implementation, a set of work collections is a workspace.

In the example embodiment, a pending work item (e.g., a work item that is added to the system 700 but not assigned to a worker) of an account (or sub-account) resides in a work collection of the account (or sub-account), and the work collection module 705 manages the work collections of the system 700. In the example embodiment, each account and sub-account of the work distribution system 700 has a set of one or more work collections, and the work collections module 705 manages the sets of work collections of all accounts and sub-accounts of the work distribution platform 700.

Figure 15:
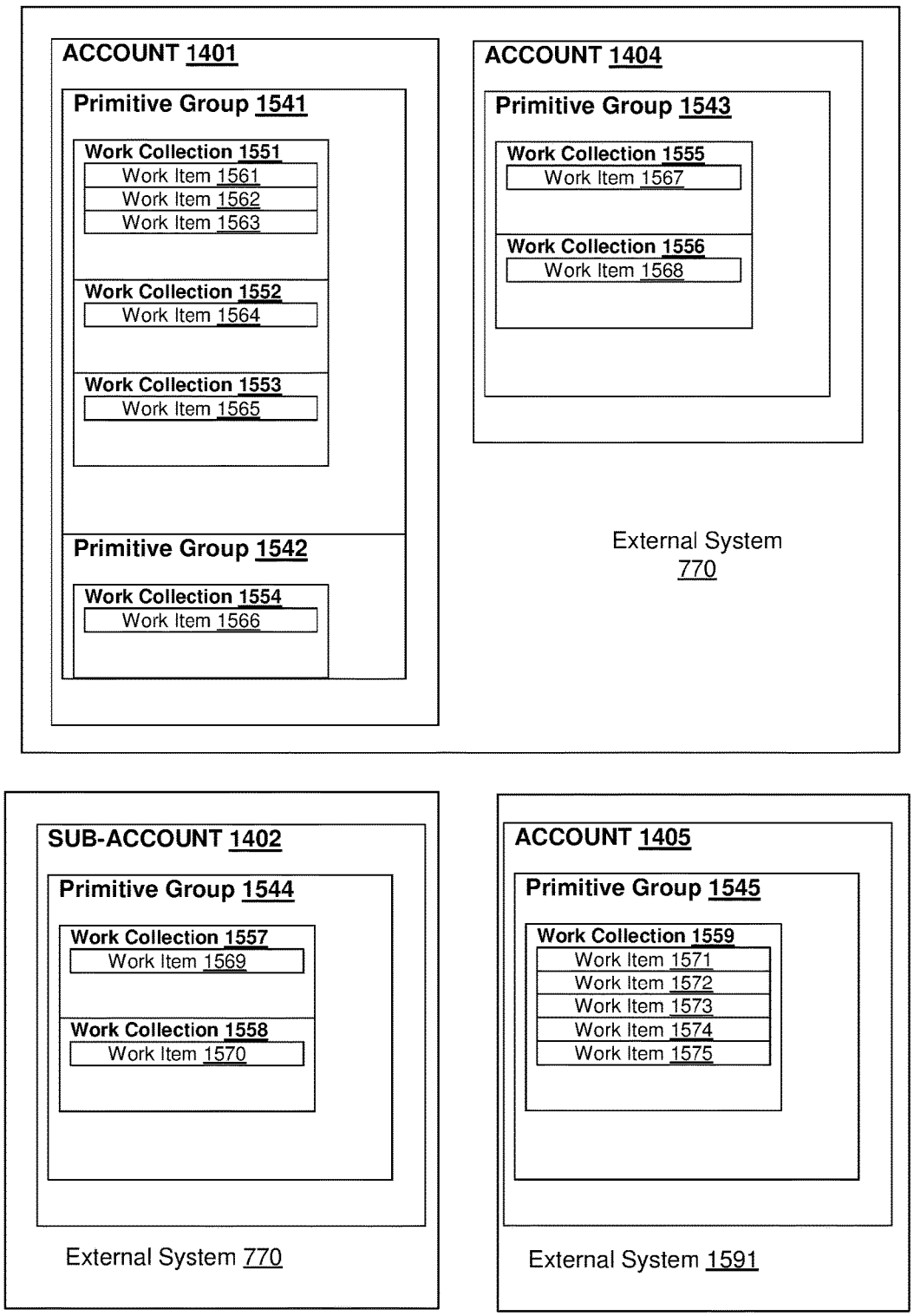
FIG. 15 is a representation of exemplary work collection sets managed by a work collections module according to an example embodiment.

FIG. 15 depicts exemplary work collection sets managed by the work collections module 705. As shown in FIG. 15, the work collections module 705 manages work collection sets 1541, 1542, 1543, 1544 and 1545. The work collection set 1541 includes three work collections 1551, 1552 and 1553. The work collection set 1542 includes one work collection 1554. The work collection set 1543 includes two work collections 1555 and 1556. The work collection set 1544 includes two work collections 1557 and 1558. The work collection set 1545 includes one work collection 1559.

In the example embodiment, work collections 1551 to 1559 are similar to the work collections 110 of FIG. 1.

The work collections 1551 to 1559 include work items 1561 to 1575 as shown in FIG. 15. In the example embodiment, the work items 1561 to 1575 are each similar to the work item 111 of FIG. 1.

In an implementation, the work collection sets 1541 and 1542 are associated with an account (e.g., the account 1401 of FIG. 14) of the external system 770, and the work collection set 1543 is associated with a second account (e.g., the account 1404 of FIG. 14) of the external system 770. The work collection set 1544 is associated with a sub-account (e.g., the account 1402 of FIG. 14) of the first account of the external system 770. The work collection set 1545 is associated with an account (e.g., the account 1405 of FIG. 14) of a second external system 1591 that is different from the system 770.

In the example embodiment, an account holder manages work collections by using the workflow API Module 707. In some embodiments, an account holder manages work collections by using an API for the work collections. In some embodiments, the work distribution system 700 manages work collections according to workflow instructions.

In the example embodiment, each work collection can be configured to specify operational logic. In some embodiments, each work collection is constructed to include an attribute that specifies an expression that defines worker selection criteria for work items residing in the work collection, and a corresponding external system configures the worker selection criteria by using at least one REST API.

In an implementation, the work collection is a queue. In some implementations, the work collection is at least one of a queue, a bin, a set and a list.

In an implementation, a work item residing in a work collection is ordered in accordance with a priority assigned to the work item by the work distribution system 700 based on a workflow instruction corresponding to the workflow information of the work item.

In some implementations, at least one work collection of the system 700 is an unordered collection of work items.

Work Distribution Processing Engine 706

In the example embodiment, the work distribution processing Engine 706 functions to assign priorities to work items of the system 700 and assign workers to work items of the system 700.

In the example embodiment, the work distribution processing Engine 706 includes a workflow API module 707, a work distribution module 708, and a workflow instruction module 709. In some implementations, the work distribution processing engine 706 includes the distribution API module 710. In some implementations, the work distribution system does not include a distribution API module.

Workflow API Module 707

In an implementation, the workflow API module 707 functions to provide a workflow instruction document request to the system 770, the request identifying a URI (Uniform Resource Identifier) that identifies a resource of the external system 770 that provides the workflow instruction document for the work item. In an implementation, the system 770 responds to the workflow instruction document request by providing the workflow API module 707 with a work instruction document response in accordance with the workflow API. In an implementation, a workflow instruction document response in accordance with the workflow API includes the Workflow Instruction Document. In an implementation, the workflow instruction document response in accordance with the workflow API includes the Workflow Instruction Document and an Assignment Callback, and responsive to assignment of a worker to the work item, the work distribution system 700 provides assignment information to the external system 770 via the Assignment Callback.

In the example embodiment, API call requests received by the workflow API module 707 include authenticating parameters, which are used by the system 700 to verify authenticity of the API call requests. In an implementation, API call requests received by the workflow API module 707 specify an account ID and a corresponding authentication token, and the workflow API module 707 uses the account module 701 to authenticate the API call request.

In an implementation, the workflow API module 707 functions to provide a Workflow API that is used by an external system to manage workflow instructions of a specified account. The workflow API module 707 is constructed to process requests received from an external system to add a workflow instruction to the work distribution system 700, and requests received from an external system to remove a workflow instruction from the work distribution system 700, read a workflow instruction, and update a workflow instruction.

Table 3 shows the API call requests (and the corresponding parameters) that are processed by the workflow API module 707, in accordance with an implementation.

TABLE 3

| Workflow API | |
|---|---|
| Workflow API CALL REQUEST | PARAMETERS |
| Add Workflow Instruction | <Workflow Instruction Name>, <Workflow Instruction>, <Assignment Callback>, <Account Identifier>, <Authentication Token>, (Optional Parameters: <Primitive Group Identifier>) |
| Remove Workflow Instruction | <Workflow Instruction Name>, <Account Identifier>, <Authentication Token> |
| Read Workflow Instruction (managed by the Work Instruction Module 709) | <Workflow Instruction Name>, <Account Identifier>, <Authentication Token> |
| Update Workerflow Instruction | <Workflow Instruction Name>, <Workflow Instruction>, <Assignment Callback>, <Account Identifier>, <Authentication Token> |

As shown in Table 3, in an implementation, the Add Workflow Instruction API call request includes the optional parameter <Primitive Group Identifier> to specify a Primitive Group Identifier for the added workflow instruction. In an implementation, the work distribution system 700 automatically assigns a Primitive Group Identifier for the added workflow instructions based on Account Preferences of the work distribution account specified by the <Account Identifier> parameter.

Work Distribution Module 708

In the example embodiment, the work distribution module 708 functions to assign priorities to work items of the system 700 and assign workers to work items of the system 700.

Workflow Instruction Module 709

In the example embodiment, the workflow instruction module 709 functions to manage workflow instructions of the work distribution system 700.

API Call Request Queuing

In the example embodiment, the worker API module 702, the work item API module 704, and the workflow API module 707 each place received API call requests in a respective API call request queue.

In an implementation, API call requests are serviced at a rate suitable for the current capacity of the work distribution system 700. The servicing rate may alternatively be adjusted according to the number of requests in the respective API call request queue. In an implementation, an API call request is placed in a respective API call request queue when capacity is exceeded or alternatively placed in the queue for every request or based on any suitable rule.

In an implementation API call requests of different work distribution accounts (and sub-accounts) are ordered in the respective queue in a staggered or alternating fashion. In some implementations, account holders have priority based on at least one of a service plan, a first-come-first-serve policy, a type of call request, and any suitable type of policy.

In some implementations, the worker API module 702, the work item API module 704, and the workflow API module 707 each have an API call request queue dedicated to requests of a single account holder, API call requests are organized into an API call request queue for each account holder, and dequeueing occurs in an alternating fashion between the plurality of API call request queues.

Communication Platform 711

In the example embodiment, the communication platform 711 functions to provide telephony communication to the work distribution system 700 via a REST API, and generates outgoing telephony communication initiated via the REST API. In the example embodiment, the communication platform 711 is external to the work distribution system 700. In some embodiments, the communication platform is internal to the work distribution system 700.

In the example embodiment, the communication platform 711 is used in the execution of communications based applications. For example, the communication platform can facilitate execution of automated call logic such as in U.S. Pat. No. 8,306,021 issued on 6 Nov. 2012, which is hereby incorporated in its entirety by this reference. In the example embodiment, the communication platform 711 is a telephony communication platform. In some embodiments, the communication platform is any suitable type of communication platform.

In some implementations, the system 700 receives work items from the communication platform 711 via the work item API module 704.

4. Method for a Multi-Tenant Work Distribution Platform

Figure 8:
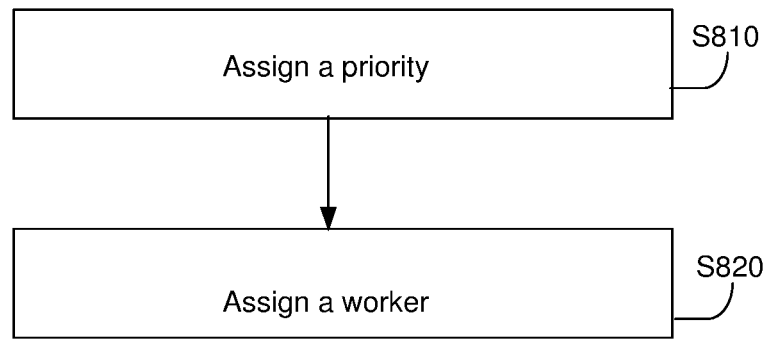
FIG. 8 is a flowchart representation of a method according to an example embodiment.

As shown in FIG. 8, a method for a multitenant work distribution platform (e.g., the platform of the system 700 of FIG. 7) in accordance with an example embodiment includes: assigning a priority to a first work item (e.g., one of the work items 1561 to 1575 of FIG. 15) of a first external system (e.g., the external system 770 of FIG. 7) S810, and assigning a worker (e.g., a worker associated with one of the worker endpoints 772 and 773 of FIG. 7) to the first work item S820.

In the example embodiment of FIG. 8, the method of FIG. 8 is implemented in the multi-tenant work distribution system 700 of FIG. 7. In the example embodiment, the Work Distribution Processing Engine 706 performs the blocks S810 and S820. In some embodiments, the method of FIG. 8 is implemented in any suitable type of multi-tenant work distribution system.

Block 810, which includes assigning a priority to a first work item of a first external system, functions to assign the priority to the work item (e.g., the work item 1561 of FIG. 15) based on work item attributes (e.g., 1102 of FIG. 11) of the work item and a workflow instruction (e.g., the workflow instruction 1020 of FIG. 10) corresponding to workflow information (e.g., 1103 of FIG. 11) specified by the work item. In the example embodiment, the work item is received via the work item API module 704. In an implementation, the workflow instruction is provided by the external system via the workflow API module 707. In the example embodiment, the work item is specified in a work item API call request provided by the external system 770 and received by the work item API module 704. In an implementation, the workflow instruction is specified in a workflow API call request provided by the external system 770 and received by the workflow API module 707. In an implementation, the workflow instruction is specified in a workflow API response provided by the external system 770 and received by the workflow API module 707 responsive to a request provided by the workflow API module 707 to the external system 770. During processing of the work item API call request, the system adds the work item to a work collection managed by the work collection module 705. In an implementation, the work collection is specified in the API call request. In an implementation, the work collection is specified by configuration information associated with the account holder corresponding to the work item API call request. In an implementation, the work collection is a default work collection. Responsive to selection of the work item in the work collection, the system 700 assigns the priority to the work item.

Figure 9:
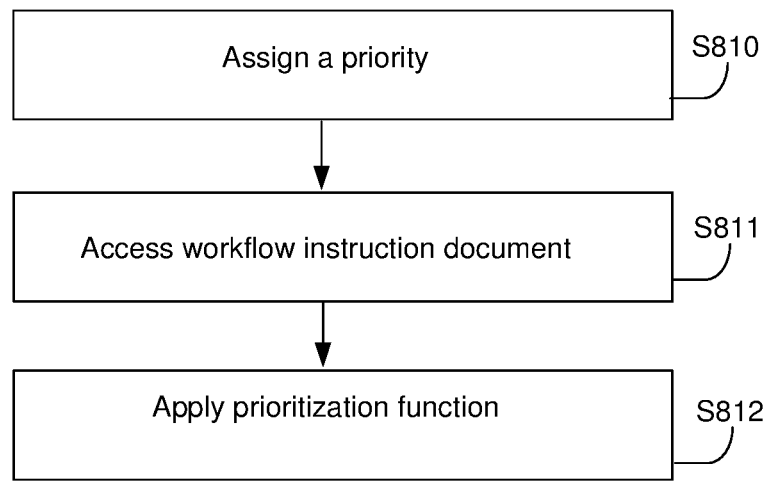
FIG. 9 is a flowchart representation of a method according to an example embodiment.

As shown in FIG. 9, in an implementation of the example embodiment assigning a priority to a work item of a first external system includes accessing a workflow instruction document (e.g., 1000 of FIG. 10) specified by the workflow information (e.g., 1103 of FIG. 11) of the work item S811, and applying a prioritization function (e.g., 1010 of FIG. 10) to the work item S812.

Figure 10:
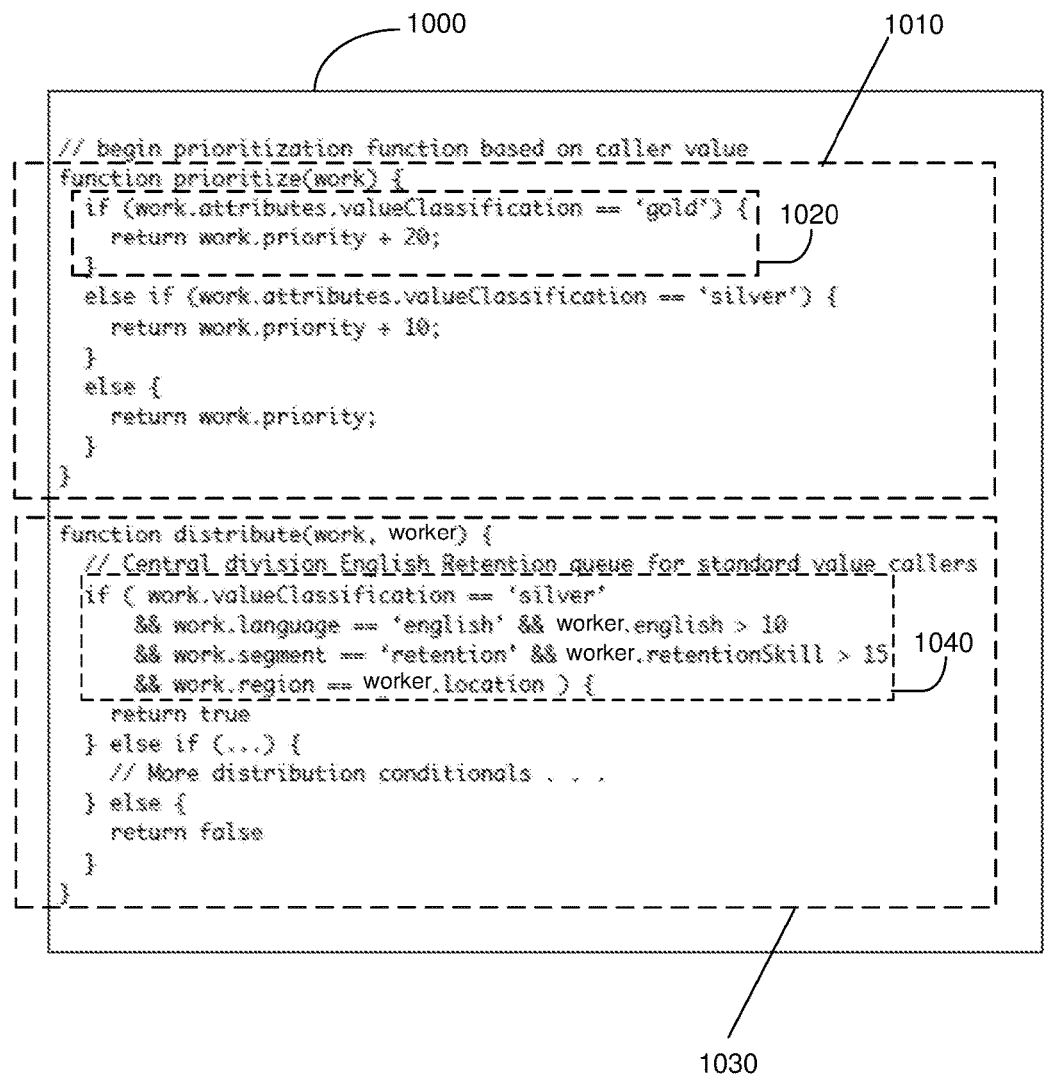
FIG. 10 is an exemplary workflow instruction document according to an example embodiment.

Block S811, which includes accessing a workflow instruction document specified by the workflow information of the work item, functions to control the work distribution module 708 to access the workflow instruction document by using the workflow instruction module 709. In the example embodiment, the workflow instruction document (e.g., 1000 of FIG. 10 specifies the prioritization function (e.g., 1010 of FIG. 10), and the prioritization function includes the workflow instruction (e.g., 1020 of FIG. 10). FIG. 10 depicts an exemplary workflow instruction document 1000 that includes a prioritization function 1010 and a workflow instruction 1020. The prioritization workflow instruction 1020 defines a work item expression "(work.attributes.valueClassification=='gold')" and a corresponding priority value "work.priority+20". In the example embodiment, the work distribution system 700 defines an expression syntax for work item expressions used in the work distribution system 700. FIG. 11 depicts a data structure that represents an exemplary first work item 1101. As shown in FIG. 11, the work item 1101 has work item attributes 1102 that include a "valueClassification" attribute having a "gold" value. During processing of the work item 1101 by using the workflow instruction document 1000, the workflow distribution module 708 determines that the work item 1101 matches the first work item expression of the prioritization workflow instruction 1020 because the first work item expression specifies a "gold" value for the "valueClassification" work item attribute and the work item 1101 has a "valueClassification" work item attribute having a "gold" value.

In the example embodiment, the external system (e.g., 770 of FIG. 7) defines the workflow instructions of the workflow instruction document (e.g., 1000) according to the expression syntax defined by the work distribution system 700, and the external system also specifies the work item attributes of the work item (e.g., 1101). In this manner, the external system (e.g., 770) can use the work distribution system 700 to perform work item distribution in accordance with business logic of the external system. In this manner, the work distribution system 700 can be used to distribute any type of work item for any type of external system.

FIGS. 12A, 12B and 12C depict exemplary prioritization functions in accordance with implementations.

The prioritization function of FIG. 12A functions to prioritize a work item "work" based on an initial priority "work.priority" of the work item. The prioritization function of FIG. 12B functions to prioritize a work item "work" based on an amount that an account holder's customer associated with the work item spends (e.g., "work.attributes.spend>10000") per month for use of the service provided by the account holder. As shown in FIG. 12B, a work item associated with a customer spending over $10,000 a month is assigned a priority value of 10, whereas a work item associated with a customer spending over $1,000 (but not over $10,000) a month is assigned a priority value of 5. The prioritization function of FIG. 12C functions to prioritize a work item "work" based on an amount of elapsed since the work item was added to the work distribution system 700. As shown in FIG. 12C, if over five minutes has elapsed, then the priority of the work item is increased by 10, and a check of the work item's wait time is scheduled in another five minutes.

In an implementation, the workflow instruction module 709 receives the workflow instruction document from the external system 770 via the workflow instruction API module 707. In an implementation, the workflow instruction module 709 stores the workflow instruction document received from the external system. In an implementation, the workflow instruction module 709 uses the workflow information (e.g., 1103 of FIG. 11) specified by the work item to access the workflow instruction document from the external system 770. In an implementation, the workflow information includes a URI (Uniform Resource Identifier) that identifies a resource of the external system 770 that provides the workflow instruction document for the work item. In an implementation, the workflow instruction module 709 provides a workflow instruction document request to the system 770 via the workflow instruction API module 707, the request identifies the URI of the workflow information of the work item, and, responsive to the workflow instruction document request, the external system 770 provides the workflow instruction document in a workflow instruction document response (in accordance with the workflow API).

In an implementation, the workflow instruction document request specifies metadata of the work item and the corresponding work collection, and the external system uses the metadata to provide the workflow instruction document. In an implementation, the workflow instruction document request specifies metadata of the work item, the corresponding work collection, and corresponding workers, and the external system uses the metadata to provide the workflow instruction document. In an implementation, the external system 770 uses internal state information of the system 770 to generate the workflow instruction document. By virtue of the workflow instruction module 709 accessing the workflow instruction document specified by the workflow information of the first work item from the external system 770 after the external system 770 provides the request to add the work item to the work distribution system 700, the external system 770 can generate workflow instructions for the work item during processing of the work item to assign a priority and during processing of the work item to assign a worker.

In an implementation, if a workflow instruction document corresponding to the workflow information is stored by the workflow instruction module 709 prior to block S811, then the workflow instruction module 709 accesses the stored workflow instruction document at block S811 instead of receiving the workflow instruction document from the external system 770. In an implementation, if a workflow instruction document corresponding to the workflow information is stored by the workflow instruction module 709 prior to block S811 and a configuration parameter configures the workflow instruction module 709 to access stored workflow instruction documents when available, then the workflow instruction module 709 accesses the stored workflow instruction document at block S811 instead of receiving the workflow instruction document from the external system 770; otherwise if the configuration parameter configures the workflow instruction module to retrieve the workflow instruction document from the external server regardless of whether the document is stored by the workflow instruction module 709, then the workflow instruction module 709 receives the workflow instruction document from the external system 770.

Block S812, which includes applying the prioritization function (e.g., the prioritization function 1010 of FIG. 10) to the work item (e.g., the work item 1101 of FIG. 11), functions to control the work distribution module 708 to assign the priority value to the work item responsive to a determination by the work distribution module 708 that the work item matches the work item expression.

Reverting to FIG. 8, block 820, which includes assigning a worker to the work item, functions to assign a worker to the work item based on the priority (e.g., 1104 of FIG. 11) of the work item, the workflow information (e.g., 1103 of FIG. 11), and worker state managed by the external system (e.g., 770 of FIG. 7) via the worker API module 702. In the example embodiment, the worker state includes worker attributes, the work item is generated by the external system (e.g., 770 of FIG. 7), and the workflow instruction (e.g., 1020 of FIG. 10) is managed by the external system via the Workflow API module 707.

In an implementation, the external system 770 generates the work item based on a telephony communication received by the external system 770.

In an implementation, the work item attributes of the work item are specified by the external system 770 via the work item API module 704, and the worker attributes are specified by the external system 770 via the worker API module 702.

Figure 13:
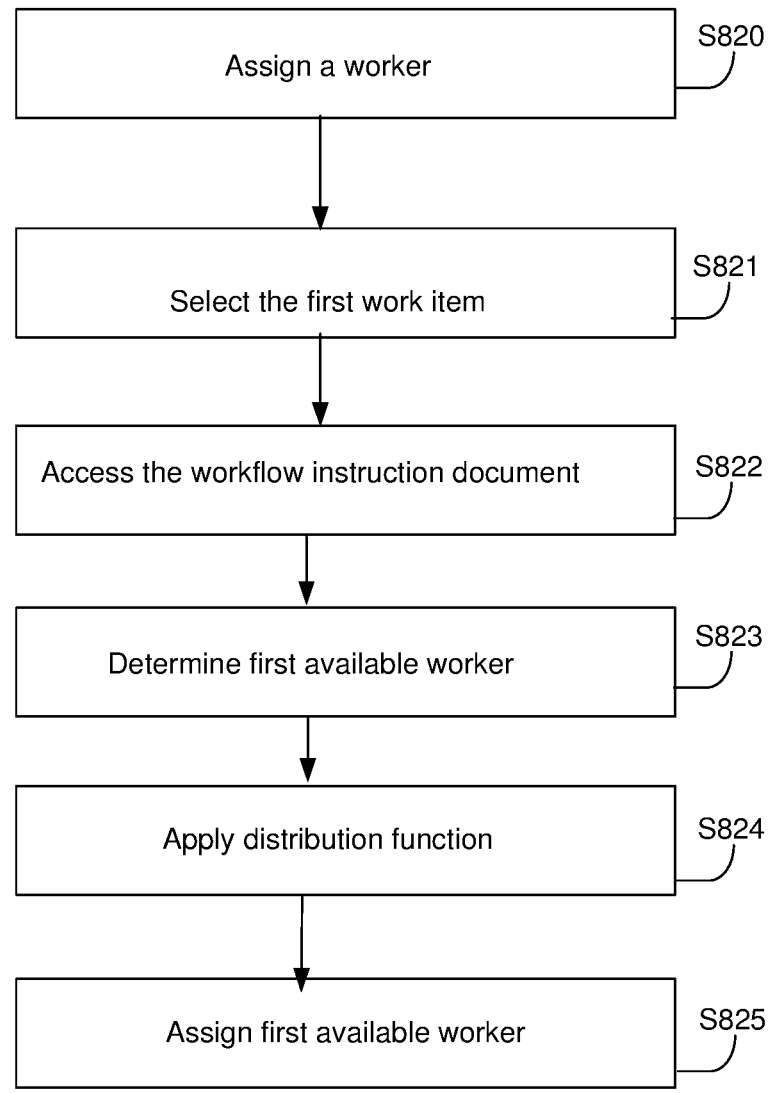
FIG. 13 is a flowchart representation of a method according to an example embodiment.

As shown in FIG. 13, in an implementation of the example embodiment, assigning a worker to the work item includes selecting the work item from a work collection in which the work item resides S821, accessing the workflow instruction document S822, determining a first available worker S823, applying a distribution function to the work item and the first available worker S824, and assigning the first available worker to the work item S825.

Block S821, which includes selecting the work item from a work collection in which the work item resides, functions to control the work distribution module 708 to select the work item (e.g., 1561 of FIG. 15) from the work collection (e.g., 1551 of FIG. 15) based on the assigned priority of the work item. In the example embodiment, the work collection is managed by the work collections module 705, and the work distribution module 708 selects the work item by using the work collections module 705. In an implementation, work items residing in the work collection (e.g., the work items 1561, 1562, and 1563 of the work collection 1551 of FIG. 15) are ordered in accordance to priority values assigned to the work items, and responsive to a request for selection of a work item by the work distribution module 708, the work collections module 705 provides the work distribution module 708 with a work item (e.g., one of 1561-1563 of FIG. 15) having a highest priority value. In other words, the selected work item is the work item of the work collection having a highest priority value.

In some implementations, the work items residing in the work collection are unordered, and responsive to a request for selection of a work item by the work distribution module 708, the work collections module 705 provides the work distribution module 708 with a work item based on at least one of a FIFO (First In First Out) selection technique, a LIFO (Last In First Out) selection technique, attributes of the work items, and any other suitable work item selection technique.

In an implementation, the work collection is a queue. In some implementations, the work collection is at least one of a queue, a bin, a set and a list.

Block S822, which includes accessing the workflow instruction document, functions to functions to control the work distribution module 708 to access the workflow instruction document (e.g., 1000 of FIG. 10 by using the workflow instruction module 709 as described herein for block S811. In the example embodiment, the workflow instruction document specifies a distribution function. The distribution function defines an assignment expression. FIG. 10 depicts an exemplary workflow instruction document 1000 that includes a distribution function 1030 and an assignment expression 1040. The assignment expression 1040 specifies work item attributes (e.g., "valueClassification", "language", "segment", "region") and worker attributes (e.g., "English", "retentionSkill", "location"). In the example embodiment, the work distribution system 700 defines an expression syntax for assignment expressions used in the work distribution system 700. FIG. 11 depicts a data structure that represents an exemplary work item 1101. As shown in FIG. 11, the work item 1101 has work item attributes 1102 that include a "valueClassification" attribute having a "gold" value, a "language" attribute having an "English" value, a "Segment" attribute having a "retention" value, and a "region" attribute having a "California" value.

During processing of the work item 1101 by using the workflow instruction document 1000, the workflow distribution module 708 determines that the work item 1101 and a worker having a "English" attribute with a value greater than 10, "retentionSkill" attribute with a value greater than 15, and a "location" attribute having a "California" value match the assignment expression 1040

FIGS. 12D and 12E depict exemplary distribution functions in accordance with implementations. The distribution function of FIG. 12D functions to assign a first available worker to the highest priority work item. The distribution function of FIG. 12E functions to assign a worker with the language skills to service the work item.

Block S823, which includes determining a first available worker, functions to control the work distribution module 708 to determine a first available worker (e.g., a worker associated with one of worker endpoints 772 and 773 of FIG. 7) managed by the external system 770 based on worker state managed by the external system (e.g., 770 of FIG. 7). In the example embodiment, the worker state for each worker includes a status which indicates whether the worker is available.

The work distribution module 708 accesses worker state for all workers associated with the work distribution account corresponding to the first work item. In some implementations, the work distribution module 708 accesses worker state for all workers associated with both the work distribution account and a workspace corresponding to the first work item. In some implementations, the work distribution module 708 accesses worker state for all workers associated with both the work distribution account and a primitive group corresponding to the first work item.

By accessing worker state for a work item based on a matching work distribution account, account holders can configure the pool of workers available to process the work items of the account holder. In other words, not only can an account holder mange generation of work items and workflow of work item assignment to workers, the account holder can also manage the pool of workers available for processing of the work items. In this manner, the work distribution system 700 provides a multi-tenant platform in which each account holder of the work distribution platform can manage their own pool of workers. In some implementations, workers can be used across accounts, with workers managed by a first account holder being available to process work items of a different account holder.

By accessing worker state for a work item based on a matching work distribution account and workspace or primitive group, account holders can configure the pools of workers for each workflow. For example, an account holder can have a primitive group (or workspace) for a sales workflow and a primitive group (or workspace) for a support workflow, and the account holder can configure different pools of workers for each of the support workflow and the sales workflow.

As another example, an account holder can have a primitive group (or workspace) for each sub-account, and the account holder can configure different pools of workers for each sub-account. For example, in a case of an account holder that provides work distribution sub-accounts for each customer of the account holder, the account holder can configure different pools of workers for each of the account holder's customers.

The distribution module 708 accesses the worker state by using the worker state module 703.

Block S824, which includes applying a distribution function to the work item (e.g., 1561 of FIG. 15) and the first available worker, functions to control the work distribution module 708 to determine a first one of available workers as identified by the accessed worker state, and apply the distribution function of the accessed workflow instruction document to the first available worker and the first work item to determine whether the first available worker matches the work item.

In an implementation, the distribution function (e.g., 1030 FIG. 10) defines an assignment expression (e.g., 1040 of FIG. 10), and the first available worker matches the work item if the work item attributes (e.g., 1102 of FIG. 11) of the work item and worker attributes of the first available worker match the assignment expression of the distribution function.

In an implementation, the worker state for each worker indicates an idle time for the worker, and the work distribution module 708 applies the distribution function to available workers based on idle time of each of the workers, such that a worker with a longer idle time is identified as an assignment candidate before other workers with shorter idle times.

Block S825, which includes assigning the first available worker to the work item, functions to control the work distribution module 708 to assign the first available worker to the work item responsive to a determination by the work distribution module 708 that the first available worker matches the work item.

In an implementation, the assignment expression includes a plurality of assignment sub-expressions, and in a case where the work item does not match any available worker based on a first assignment sub-expression, the work distribution module 708 determines whether any available workers match the work item based on a different sub-expression of the assignment expression. In an implementation, a plurality of sub-expressions are ordered, and the work distribution module 708 evaluates sub-expressions of the assignment expression according to the order of the sub-expressions in the assignment expression.

In an implementation, the work distribution module 708 records an assignment of the first available work item to the first work item.

In an implementation, the work distribution module 708 provides assignment information to the external system (e.g., 770 of FIG. 7) that provided the work item (e.g., 1561 of FIG. 15) via an HTTP callback (Assignment Callback) specified by the external system in association with the work item.

In an implementation, the assignment information specifies at least the worker attributes of the worker and the work item attributes of the work item.

The external system processes the work item responsive to receipt of the assignment information from the work distribution system 700.

In an implementation, external system 770 processes the work item by providing at least one work processing instruction to the work distribution system 770, and responsive to completion of processing of the work item by the worker, the work distribution system updates the worker state of the worker to include an available status such that the worker can be assigned to a new work item by the work distribution system 770.

In an implementation, the work processing instruction includes an instruction to provide information of the work item to a worker endpoint (e.g., one of 772 and 773 of FIG. 7) associated with the worker via a the distribution API 710.

In some implementations, the external system 770 processes the work item by providing information of the work item to a worker endpoint (e.g., one of 772 and 773 of FIG. 7) associated with the worker, and responsive to completion of processing of the work item by the worker, the external system 770 updates the worker state of the worker to include an available status via the worker API module 702 such that the worker can be assigned to a new work item by the work distribution system 700.

Figure 2:
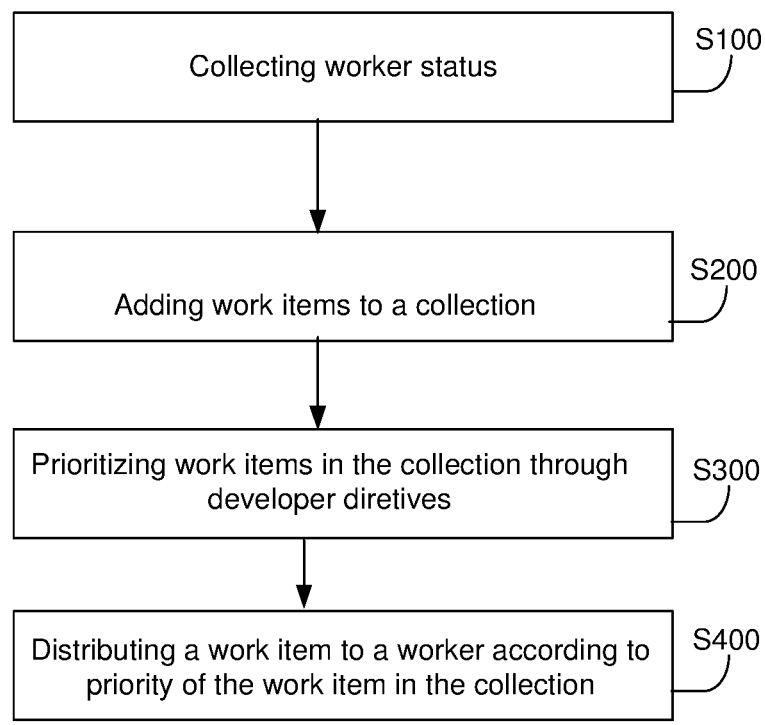
FIG. 2 is a flowchart representation of a method according to an example embodiment.

In an implementation, the first work item is delivered to a worker endpoint of the worker assigned to the first work item, in a manner similar to that described above for block S400 of FIG. 2.

In some implementations, the Work Distribution Processing Engine 706 performs the heuristics described herein for block S300 of FIG. 3, during performance of the blocks S810 and S820 of FIG. 8.

5. Method for a Multi-Tenant Work Distribution Platform

Figure 16A:
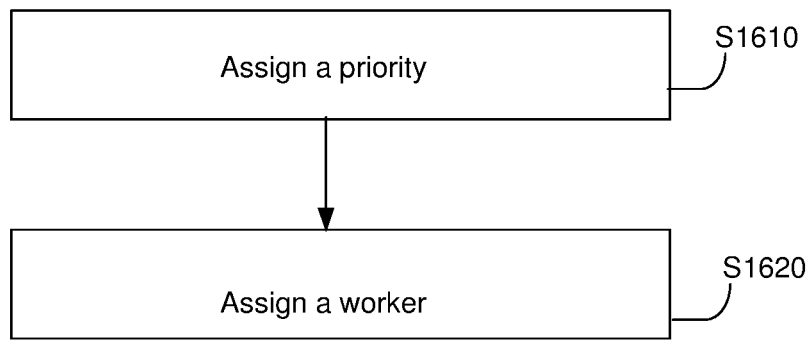
FIGS. 16A-C are a flowchart representations of methods according to example embodiments.

As shown in FIG. 16A, a method for a multitenant work distribution platform (e.g., the platform of the system 700 of FIG. 7) in accordance with an example embodiment includes: assigning a priority to a first work item (e.g., one of the work items 1561 to 1575 of FIG. 15) of a first external system (e.g., the external system 770 of FIG. 7) S1610, and assigning a worker (e.g., a worker associated with one of the worker endpoints 772 and 773 of FIG. 7) to the first work item S1620.

In the example embodiment of FIG. 16A, the method of FIG. 16A is implemented in the multi-tenant work distribution system 700 of FIG. 7. In the example embodiment, the Work Distribution Processing Engine 706 performs the blocks S1610 and S1620. In some embodiments, the method of FIG. 16A is implemented in any suitable type of multi-tenant work distribution system.

Block 1610, which includes assigning a priority to a work item of an external system, functions to assign the priority to the work item (e.g., the work item 1561 of FIG. 15) based on work item attributes of the work item and a workflow instruction corresponding to workflow information specified by the work item. In the example embodiment, the work item is received via the work item API module 704, and the workflow instruction is provided by the external system via the workflow API module 707. In the example embodiment, the work item is specified in a work item API call request provided by the external system 770 and received by the work item API module 704, and the workflow instruction is specified in a workflow API call request provided by the external system 770 and received by the workflow API module 707. In an implementation, responsive to the workflow instruction from the external system 770, the workflow instruction module 709 stores the workflow instruction. During processing of the work item API call request, the system 700 assigns the priority to the work item and places the work item in a work collection based on the workflow instruction. In an implementation, the workflow information specified by the work item identifies the workflow instruction provided by the external system 770 via the workflow API module 770 and stored by the workflow instruction module 709, and during processing of the work item API call request, the workflow instruction corresponding to the work item is accessed by using the workflow instruction module 709.

Figure 16B:
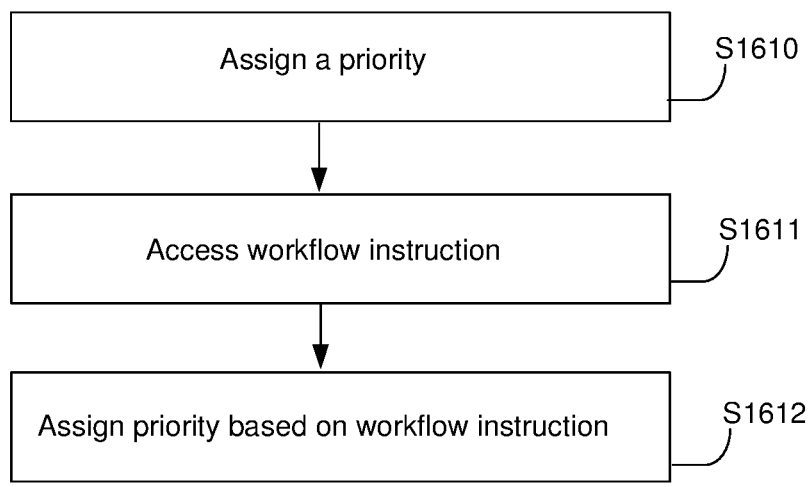

As shown in FIG. 16B, in an implementation of the example embodiment of FIG. 16A, assigning a priority to a work item of an external system includes accessing a workflow instruction specified by the workflow information of the work item, the workflow instruction specifying at least one work item expression and a corresponding priority S1611, and assigning the priority value corresponding to the workflow instruction to the work item responsive to a determination that the work item matches a work item expression of the workflow instruction S1612. In an implementation, the workflow instruction specifies a target worker expression corresponding to each work item expression of the workflow instruction.

Figure 16C:
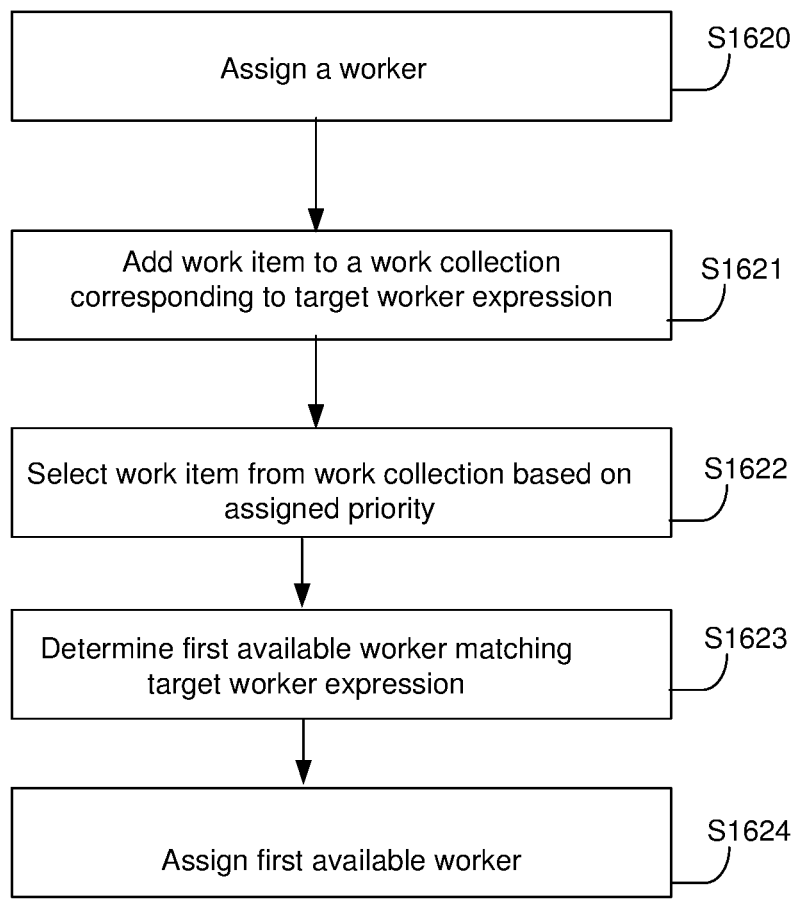

As shown in FIG. 16C, in an implementation of the example embodiment of FIG. 16A, assigning a worker to the work item includes adding the work item in a work collection corresponding to the corresponding target worker expression S1621, selecting the work item from the work collection based on the assigned priority of the work item S1622, determining a first available worker having worker attributes that match the target worker expression S1623, and responsive to a determination of a first available worker having worker attributes that match the target worker expression, assigning the first available worker to the work item S1624. In an implementation, block S1624 ("assigning the first available worker to the work item") is similar to block S825 ("assigning the first available worker to the work item") of FIG. 8.

6. System Architecture: Work Distribution System

Figure 17:
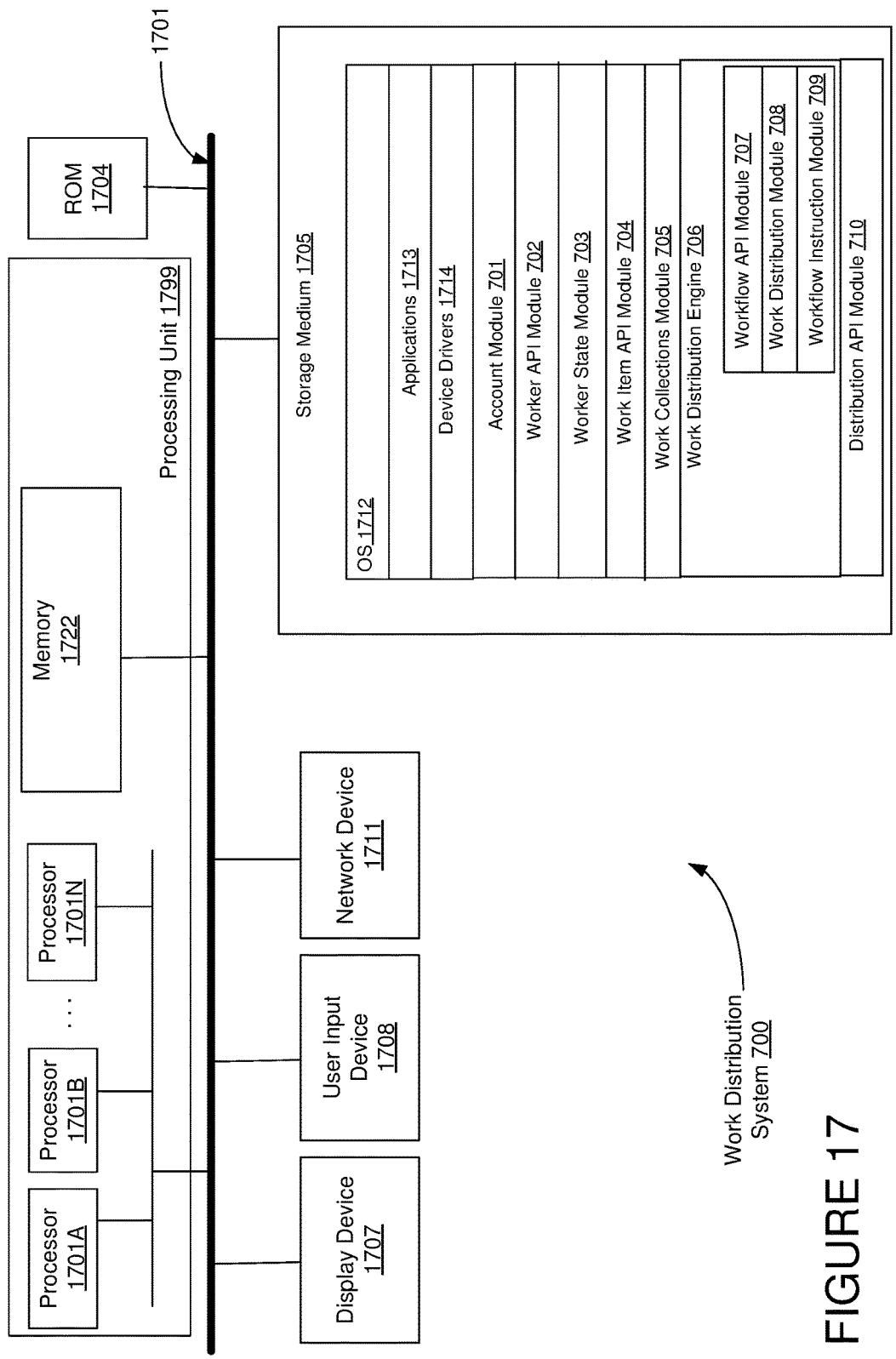
FIG. 17 is an architecture diagram of a work distribution system according to an example embodiment.

FIG. 17 is an architecture diagram of the work distribution system 700 according to an implementation in which the account module 701, the worker API module 702, the worker state module 703, the work item API module 704, the work collections module 705, the work distribution engine 706, and the distribution API module 710 are included in a server device.

The bus 1701 interfaces with the processors 1701A-1701N, the main memory (e.g., a random access memory (RAM)) 1722, a read only memory (ROM) 1704, a processor-readable storage medium 1705, a display device 1707, a user input device 1708, and a network device 1711.

The processors 1701A-1701N may take many forms, such as ARM processors, X86 processors, and the like.

In some implementations, the system 700 includes at least one of a central processing unit (processor) and a multi-processor unit (MPU).

As described above, the processors 171A-1701N and the main memory 1722 form a processing unit 1799. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the account module 701, the worker API module 702, the worker state module 703, the work item API module 704, the work collections module 705, the work distribution engine 706, and the distribution API module 710.

The network adapter device 1711 provides one or more wired or wireless interfaces for exchanging data and commands between the system 1700 and other devices, such as devices of the external system 770 of FIG. 7. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1722 (of the processing unit 1799) from the processor-readable storage medium 1705, the ROM 1704 or any other storage location. During execution of these software programs, the respective machine-executable instructions are accessed by at least one of processors 1701A-1701N (of the processing unit 1799) via the bus 1701, and then executed by at least one of processors 1701A-1701N. Data used by the software programs are also stored in the memory 1722, and such data is accessed by at least one of processors 1701A-1701N during execution of the machine-executable instructions of the software programs.

The processor-readable storage medium 1705 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1705 includes an operating system 1712, software programs 1713, device drivers 1714, the account module 701, the worker API module 702, the worker state module 703, the work item API module 704, the work collections module 705, the work distribution engine 706, and the distribution API module 710.

7. System Architecture: Application Server of External System

Figure 18:
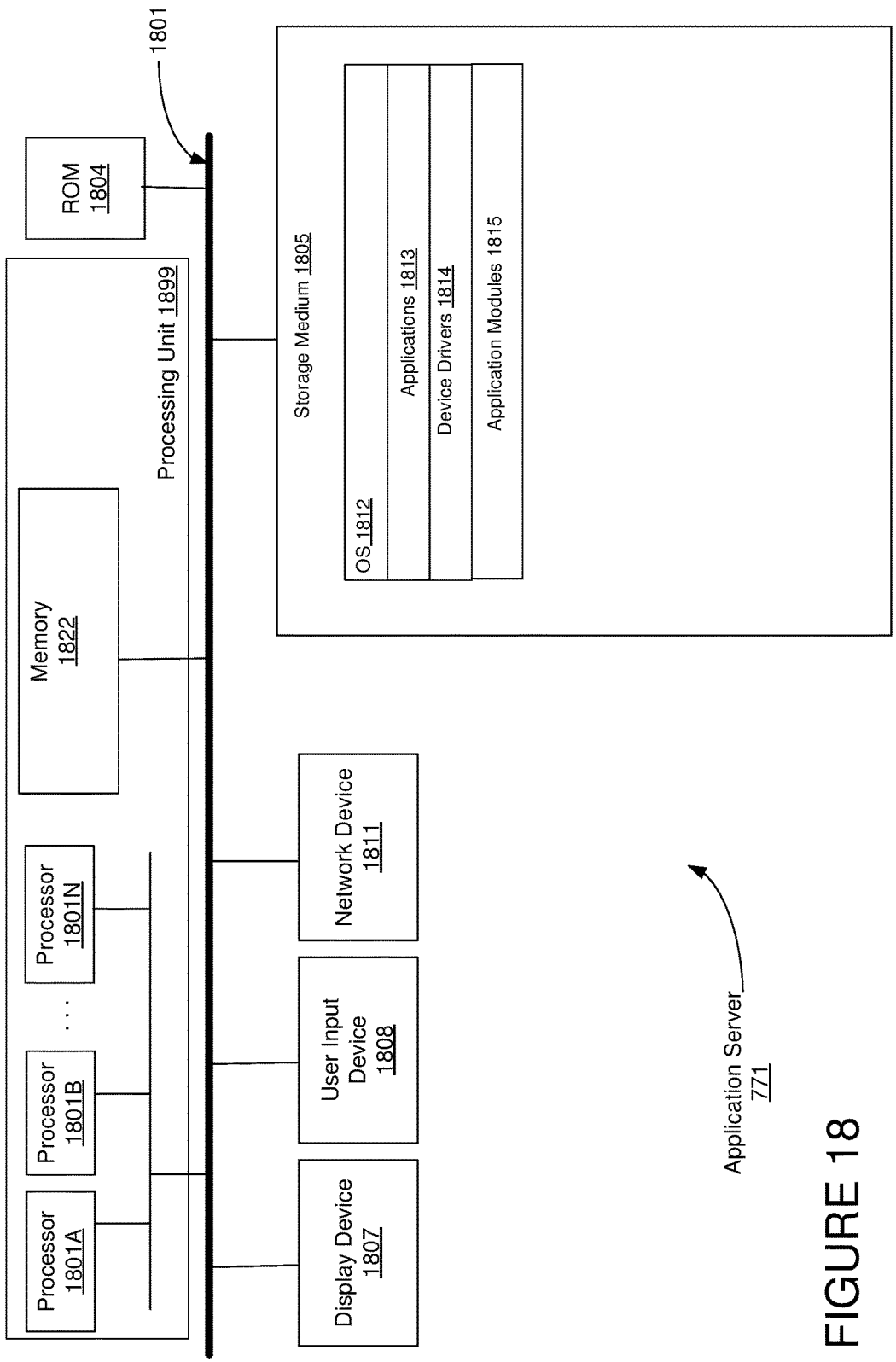
FIG. 18 is an architecture diagram of an application server of an external system according to an example embodiment.

FIG. 18 is an architecture diagram of the application server 771 of the external system 770 of FIG. 7 according to an example embodiment. In an implementation, the processors 1801A-1801N, main memory 1822, read only memory (ROM) 1804, processor-readable storage medium 1805, display device 1807, user input device 1808, network device 1811, and processing unit 1899 are similar to the processors 1701A-1701N, main memory 1722, read only memory (ROM) 1704, processor-readable storage medium 1705, display device 1707, user input device 1708, network device 1711, and processing unit 1799 of FIG. 17.

The processor-readable storage medium 1805 includes an operating system 1812, software programs 1813, device drivers 1814, and application modules 1815. In an implementation, the application modules 1815 are constructed to manage work items by using the work item API of the work item API module 704 and manage workflow instructions by using the workflow API of the workflow API module 707, as described herein.

7. System Architecture: Worker Endpoint Device

Figure 19:
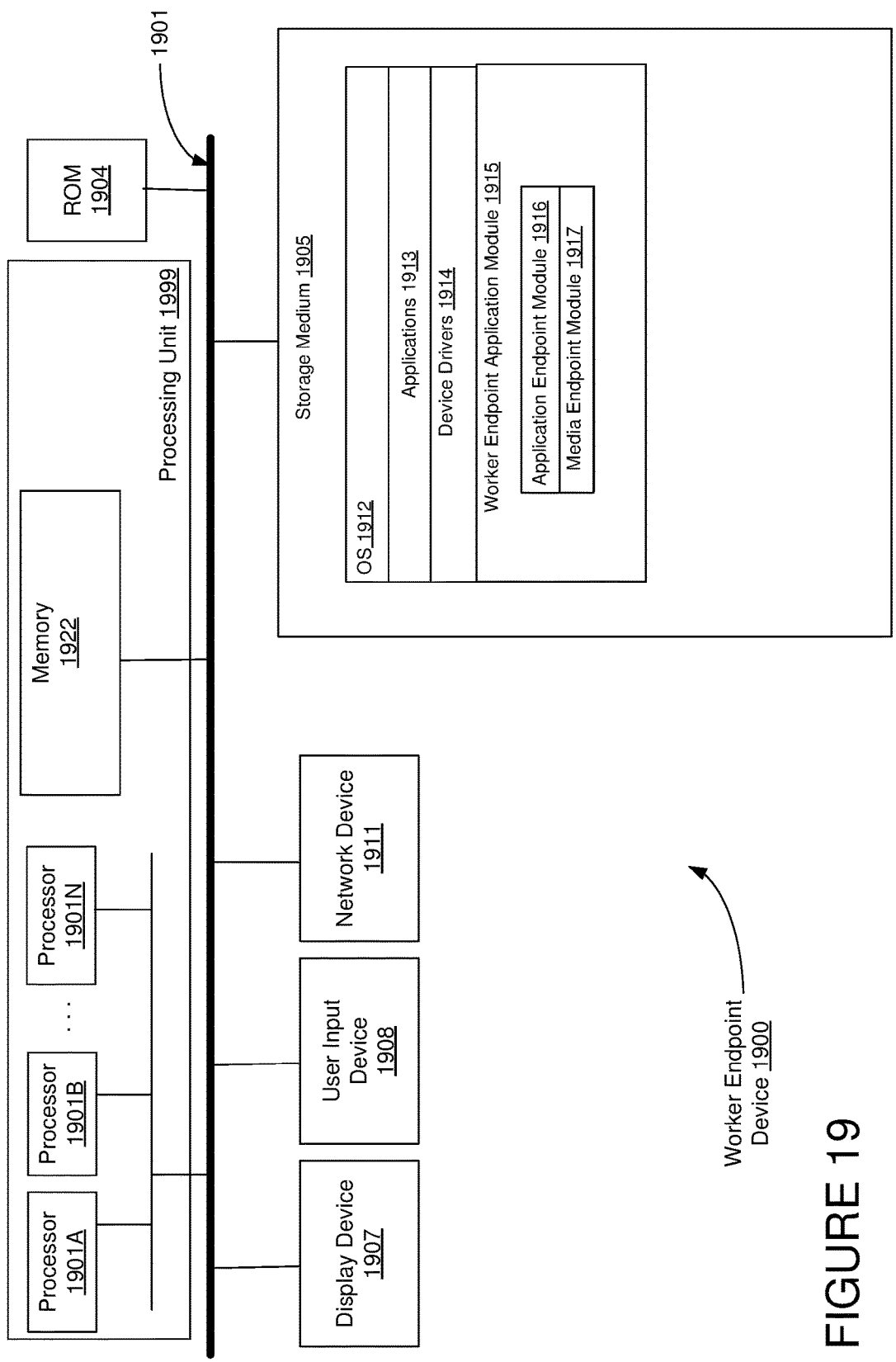
FIG. 19 is an architecture diagram of a worker endpoint device of an external system according to an example embodiment.

FIG. 19 is an architecture diagram of a worker endpoint device 1900 of the external system 700 of FIG. 7 according to an example embodiment. The worker endpoint device 1900 implements the worker endpoint 772 of FIG. 7. In an implementation, a worker endpoint device that implements the worker endpoint 773 of FIG. 7 has an architecture similar to the architecture of the worker endpoint device 1900.

In an implementation, the processors 1901A-1901N, main memory 1922, read only memory (ROM) 1904, processor-readable storage medium 1905, display device 1907, user input device 1908, network device 1911, and processing unit 1999 are similar to the processors 1701A-1801N, main memory 1722, read only memory (ROM) 1704, processor-readable storage medium 1705, display device 1707, user input device 1708, network device 1711, and processing unit 1799 of FIG. 17.

The processor-readable storage medium 1905 includes an operating system 1912, software programs 1913, device drivers 1914, and a worker endpoint application module 1915. The worker endpoint application module 1915 includes a worker application endpoint module 1916 and a media endpoint module 1917.

The worker endpoint application module 1915 corresponds to the worker endpoint 772, the worker application endpoint module 1916 corresponds to the worker application endpoint 774, and the media endpoint module 1916 corresponds to the media endpoint 776 of FIG. 7.

In an implementation, the worker endpoint application module 1915 is constructed to manage a worker associated with the worker endpoint 772 of FIG. 7 by using the worker API of the worker API module 702 and process work items received by using the distribution API of the distribution API module 710, as described herein.

CONCLUSION

The systems and methods described herein with respect to a "first work item" and a "first external system" function in a similar manner with respect to other work items and external systems.

The system and method of the preferred embodiment and variations thereof can be embodied and/or implemented at least in part as a machine configured to receive a computer-readable medium storing computer-readable instructions. The instructions are preferably executed by computer-executable components preferably integrated with the work distribution system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
an application server system associating a plurality of worker identifiers with a first account by providing at least one worker request to an external work distribution system via a network device of the application server system;
the application server system providing a first work item request to the work distribution system via the network device of the application server system, wherein the first work item request is a request of the first account; and
the application server system receiving first assignment information from the work distribution system via the network device of the application server system as a response to the first work item request, wherein the first assignment information specifies a first worker identifier of the plurality of worker identifiers associated with the first account and at least one work item attribute of the first work item request.

2. The method of claim 1, wherein the work distribution system is a multitenant work distribution system that manages a plurality of accounts including the first account.

3. The method of claim 1, further comprising:
the application server system processing a work item of the first work item request responsive to receipt of the first assignment information.

4. The method of claim 1, wherein the at least one work item attribute includes at least one of a value classification attribute, a language attribute, a segment attribute, and a region attribute.

5. The method of claim 3, wherein the application server system is a system of a vehicular ride-share platform, wherein the first work item request is for a ride request work item, and wherein the first worker identifier is an identifier of a driver of the ride-share platform.

6. The method of claim 3, wherein the application server system is a system of a service booking platform, and wherein the first work item request is for a service booking work item.

7. The method of claim 3, wherein the application server system is a system of a question/solution platform, and wherein the first work item request is for a question/solution work item.

8. The method of claim 3, wherein the application server system is a system of a call center system, wherein the first work item request is for a call work item, and wherein the first worker identifier is an identifier of a call center agent of the call center system.

9. The method of claim 3, wherein the application server system is a system of CRM system.

10. The method of claim 3, wherein the application server system is a system of a customer service system, wherein the first work item request is for a customer service work item, and wherein the first worker identifier is an identifier of a customer service agent of the customer service system.

11. The method of claim 3, wherein the application server system is a system of a service provider system, wherein the first work item request is for a service provider work item, and wherein the first worker identifier is an identifier of a service provider of the service provider system.

12. An application server system comprising:
a network device;
at least one processing unit constructed to execute machine-executable instructions of at least one storage medium of the application server system; and
the at least one storage medium, wherein the at least one storage medium stores machine-executable instructions for controlling the application server system to:
associate a plurality of worker identifiers with a first account by providing at least one worker request to an external work distribution system via the network device;
provide a first work item request to the work distribution system via the network device, wherein the first work item request is a request of the first account; and
receive first assignment information from the work distribution system via the network device as a response to the first work item request, wherein the first assignment information specifies a first worker identifier of the plurality of worker identifiers associated with the first account and at least one work item attribute of the first work item request.

13. The system of claim 12, wherein the at least one storage medium stores machine-executable instructions for controlling the application server system to process a work item of the first work item request responsive to receipt of the first assignment information.

14. The system of claim 13, wherein the application server system is a system of a vehicular ride-share platform, wherein the first work item request is for a ride request work item, and wherein the first worker identifier is an identifier of a driver of the ride-share platform.

15. The system of claim 13, wherein the application server system is a system of a service booking platform, and wherein the first work item request is for a service booking work item.

16. The system of claim 13, wherein the application server system is a system of a question/solution platform, and wherein the first work item request is for a question/solution work item.

17. The system of claim 13, wherein the application server system is a system of a call center system, wherein the first work item request is for a call work item, and wherein the first worker identifier is an identifier of a call center agent of the call center system.

18. The system of claim 13, wherein the application server system is a system of CRM system.

19. The system of claim 13, wherein the application server system is a system of a customer service system, wherein the first work item request is for a customer service work item, and wherein the first worker identifier is an identifier of a customer service agent of the customer service system.

20. The system of claim 13, wherein the application server system is a system of a service provider system, wherein the first work item request is for a service provider work item, and wherein the first worker identifier is an identifier of a service provider of the service provider system.

\* \* \* \* \*